(12) United States Patent
Cho

(10) Patent No.: US 8,287,263 B2
(45) Date of Patent: Oct. 16, 2012

(54) MACHINE FOR PRODUCING EXPANDED-GRAIN CAKES

(75) Inventor: Yoon Sang Cho, Seoul (KR)

(73) Assignee: Coco International, Inc., Ridgefield, NJ (US)

( * ) Notice: Subject to any disclaimer, the term of this patent is extended or adjusted under 35 U.S.C. 154(b) by 98 days.

(21) Appl. No.: 13/014,257

(22) Filed: Jan. 26, 2011

(65) Prior Publication Data

US 2011/0293766 A1 Dec. 1, 2011

(30) Foreign Application Priority Data

May 31, 2010 (KR) .................. 10-2010-0051387

(51) Int. Cl.
*B29C 45/76* (2006.01)
(52) U.S. Cl. ........ 425/140; 425/145; 425/149; 425/150; 425/451.4; 425/451.5; 425/451.9
(58) Field of Classification Search ................. 425/140, 425/145, 149, 150, 451.4, 451.5, 451.9, 589, 425/592
See application file for complete search history.

(56) References Cited

U.S. PATENT DOCUMENTS

| | | | |
|---|---|---|---|
| 2,777,404 A | 1/1957 | Halset | |
| 4,147,014 A | 4/1979 | Tashiro et al. | |
| 4,158,539 A * | 6/1979 | Arends et al. | 425/451.4 |
| 4,281,593 A | 8/1981 | Gevaert | |
| 4,328,741 A | 5/1982 | Yoshikazu | |
| 4,376,744 A * | 3/1983 | DeSantis | 425/593 |
| 4,377,377 A * | 3/1983 | Arends et al. | 425/451.4 |
| 4,667,588 A | 5/1987 | Hayashi | |
| 5,102,677 A | 4/1992 | Van Den Berghe | |
| 6,524,090 B1 * | 2/2003 | Hayashi et al. | 425/140 |
| 7,444,928 B2 | 11/2008 | Kim | |

FOREIGN PATENT DOCUMENTS

EP 545725 * 6/1993 ................ 425/140

* cited by examiner

Primary Examiner — Tim Heitbrink
(74) Attorney, Agent, or Firm — Siegmar Silber, Esq.

(57) ABSTRACT

Disclosed herein is a machine for producing expanded-grain cakes. The machine includes a frame, a mold unit, a grain supply unit, a grain transfer unit, a mold pressure arm, a drive unit, an open cam, a control unit and a cover unit. A precise charge of cereal grain is metered at the grain supply unit and in synchronism with the mold open cycle, distributed evenly over the mold cavity. Then with the mold unit clamped closed, the charge is heated and, at the end of the baking cycle, a preform is produced with gases at high pressure entrained therewithin. Upon release from the mold, the preform expands to a grain cake of the desired size. The machine controls the thermal energy input, the cycle frequency, the size of the grain charge, and the ejection trajectory. Several interrupts are used to ensure conformance to the control parameters and to enhance operator safety.

20 Claims, 15 Drawing Sheets

MACHINE FOR PRODUCING EXPANDED-GRAIN CAKES

CROSS-REFERENCE TO RELATED APPLICATION

This application claims priority of Republic of Korea Patent Application No. 10-2010-0051387, which was filed on May 31, 2010, and is incorporated herein by reference in its entirety.

BACKGROUND OF THE INVENTION

1. Field of the Invention

The present invention relates generally to a baking-in-a-mold apparatus for producing molded preforms which, upon release from the mold, become expanded-grain cakes. More particularly, the invention relates to an improving of the machine production parameters and enhancing operator safety.

2. Description of the Prior Art

Generally, an apparatus for producing expanded-grain cakes is a molding machine in which a predetermined charge of admixed cereal grains is inserted into a hermetically sealed mold cavity thereof and subjected to pressure baking by a predetermined cycle of temperature. The product of the molding machine is a preform or molded cake. During baking, the moisture content of the cereal is converted into entrapped steam and, upon rejection from the mold cavity, the entrapped steam from the treated charge of grain expands the molded cake to an expanded grain cake of the desired size.

As will be seen from the following, the machine subsystems enhanced hereby include, but are not limited to, the grain feed and controls therefor, the preheating of the mold cavity, the monitoring and maintenance of mold temperature and pressure, the mold-cavity release mechanism, and the control system interrupts of the molding process when an error or component malfunction occurs.

In detail, when an appropriate charge of cereal grain is sealed in a mold and heat is applied thereto, the grain expands to a preform constrained by the walls of the mold and entrains therewithin the moisture content of the grain in a gaseous, high-pressure state. Thereafter, when the mold which had been sealed opens, the high-pressure gas in the preform suddenly expands until it reaches ambient pressure and, acting as a blowing agent rapidly expands several fold to produce the expanded grain-cakes of the desired size.

In the past, the machines that were introduced for producing expanded-grain cakes experienced numerous problems that were seemingly inherent to the accepted design at the time. Of prominence among the problems was that the shapes of produced expanded-grain cakes were not uniform. Particularly this problem seemed to arise in those machines wherein the supply of cereal grains and the clamping of the mold were provided by the single-drive unit machine. After such a machine was used over an extended period of time, the amount of the charge of cereal grain tended to become non-uniform as errors accumulated. Also and concomitantly, the charge of cereal grain was not spread evenly in the mold cavity resulting in misshapen preforms and lopsided expanded-grain cakes. The early prior art machines did not program the delivery of thermal energy and, once the heat was delivered, were unable to maintain the pressure in the closed-mold unit. Both of these factors contributed to non-uniformity.

Furthermore, with such errors accumulating and an insufficient amount of cereal grain being supplied to the mold, the clamping operation during the closed-mold phase frequently occurred when the grain transfer unit was not completely removed from the mold. If not stopped in time, this potentially could result in damage to the grain-transfer unit.

Moreover, the prior art machines had no means for preheating the mold. Hence, when thermal energy was underdelivered the process in the mold did not sufficiently heat the contents and resulted in insufficient generation of blowing gases. Under such conditions, some of the cereal grains supplied to the mold would remain therein as there was an insufficient volume of gas to clear the cavity.

The remanent cereal grains in the mold cavity frequently became scorched, burned, and discolored resulting in a contaminated mold. Until all the burned grain was removed from the mold the expanded-grain cakes produced by the contaminated machine was not of marketable quality.

In the prior art machines, to solve these problems, an operator, upon opening the mold unit, would clear the mold cavity of debris using a tool such as a brush or the like. However, as such cleaning was conducted with the mold at a high temperature, the cleaning was performed under unsafe, hazardous conditions.

Furthermore, in most prior art machines, the hopper was integrated with the machine and the operator had no visual cue as to the amount of cereal grain remaining. Because the hopper was typically made of stainless steel the user could not observe the amount of cereal grain in the hopper. Without sensors to set off interrupts, such a machine may be operated through one or more molding operations without sufficient cereal grain in the mold and thereby expose the machine to unnecessary downtime.

While the above recitation of problems inherent in the prior art machines is remarkable, it clearly is not an exhaustive collection thereof. However, these and other problems resulted in certain technological re-evaluations being made prior to the present invention. During re-evaluation, the state-of-the-art was examined and the following discussion is of the patent literature which has become known to the inventor and the assignee hereof.

In the prior art a number of machines of this type have been developed that include heated mold components which during operation are moved away from one another for loading of a predetermined charge of cereal grain and for unloading a baked product. Such machines were commonly developed in the Pacific Rim countries such as South Korea and Japan where rice cakes play an important role in the diet.

U.S. Pat. No. 7,444,928 to Kim (Kim '928), entitled "Apparatus for Producing Crackers", discloses an apparatus capable of mechanically producing expanded-grain cakes. The patent is a non-priority filing of Korean Patent 10-571883, filed Mar. 9, 2004. The Kim '928 apparatus has a single drive motor and, through transmitting the rotary power thereof using power takeoffs and cams, was able to replace the air cylinders and air compressors which sequenced the operations of earlier machines. The resultant machine did not have sufficient fail/safe features as is apparent when the invention described below is understood.

In Korean Patent 0134900, issued Dec. 15, 1998, to Seo a machine for rice cakes is shown with a cam-sequenced clamping arm and a reciprocating grain delivery tray. Once the delivery tray is positioned over the lower mold, the bottom of the tray is withdrawn to effect delivery of the grain.

The patent to Yoshikazu, U.S. Pat. No. 4,328,741, issued May 11, 1982, is an air cylinder operated molding machine which is distinguished from prior devices as the machine did not require bonding agents in the charge of cereal grains. Yoshikazu describes twice molding the grain cakes by first pressure baking and expansion and, then compressing the expanding cake to achieve the desired form.

In a manner similar to Yoshikazu, a Japanese patent to Ryoji Watanabe, JP62-118850, published May 30, 1987, shows a structure for automating the production of ikasenbei (a Japanese cracker containing cuttlefish) having an air cylinder operated molding machine with a reciprocating slider for loading raw material into the mold cavity.

During the 1970's and 1980's, Gevaert obtained several patents on expanded cereal-based food product machines. Typical of the Gavaert patents is U.S. Pat. No. 4,281,583 which describes a molding machine with a hydraulic jack that raises and lowers a lower mold portion to close and open the mold, respectively. The precooked cereal grain is further cooked in the closed mold and gains its final shape by, after releasing the steam from this process, moving the upper mold downward to release the compressed and treated material.

A patent to Van den Berghe, U.S. Pat. No. 5,102,677 describes making a pressure baked, cereal grain cake in a heated mold and, afterwards, upon release from the mold, expands. Van den Berghe discloses two different molding units—a two-part mold in which hydraulic cylinders drive mold components to selected positions, and a three-part with a fixed upper, a positionable peripheral or ring mold, and a heatable removable lower mold. In the three-part mold, the downward positioning of the ring mold and the lower mold permits the removal of the expanded grain cake.

The above prior art developments are exemplary and provide a background against which the advances presented by the below-described invention may be viewed.

SUMMARY

In the present invention, a machine for producing expanded-grain cakes is provided and is constructed with a chassis or base, a grain hopper and metering device, a mold, a grain transfer unit, a drive unit, an electronic controller, and a programmable heating unit. The chassis houses the previously described subsystems. The mold that is provided in the central portion of the base and, in operation pressure bakes a charge of cereal grain which is ejected at the end of a predetermined cycle as a yet-to-expand preform. The grain hopper and metering device supplies a precisely metered charge of cereal grain from a hopper provided on the upper end of the frame to a grain transfer unit. Separate drive units synchronously operate the grain transfer unit and the mold so as to deliver and evenly distribute the charge of cereal grain during the mold open portion of the cycle and to open the mold at the end of each cycle. The heating unit functions to preheat and to heat the mold and provide repetitively the same quantity of thermal energy during each cycle.

The mold comprises an upper mold and a lower mold. The lower mold is stationary. The upper mold is attached to a pressure arm which during the mold closed portion of the cycle, clamps the upper mold closed, and during the mold open portion of the cycle lifts the upper mold from the lower mold. The upper mold is constructed with a spring tensioner device which, during the closed portion of the molding cycle, is compressed by the pressure arm.

The mold pressure arm subsystem is a pivoted body having a free end with a cam follower thereon and an attached end connected through a flexible coupling to the upper mold portion. During the closed-mold phase of the machine cycle the mold pressure arm acts as a clamping device and serves to hermetically retain within the mold cavity the cereal grain and the gaseous products of the evaporated moisture content—basically steam at high pressure. In order to attain hermetic sealing, any end play in the flexible coupling is overcome by adjustably extending the attachment end of the mold pressure arm.

The mold pressure arm subsystem is cam controlled and, for the duration of the closed-mold phase of the cycle, the previously mentioned cam follower traces against the cam perimeter and thereby maintains the requisite clamping force. As the cam rotates, the cam follower reaches the end of the closed-mold phase and disengages from the cam, permitting the free end to fall and to pivot about the mounting pivot to assist in lifting the upper mold portion to the open-mold position. Simultaneously, with the pressure arm falling, the clamping force on the spring tensioner is released and the stored energy in the compressed spring urges the mold to the open position. As the mold opens, the preform is ejected from the mold by the high-pressure steam therewithin and expands until ambient pressure is reached.

From the grain supply unit, the delivery of a charge of cereal grain proceeds by grain proceeds by gravity feed from a cereal grain hopper to a cup-like rotary housing. Cereal grain from the hopper falls through an open inlet and fills a rotary housing, which, in synchronicity with a grain transfer unit, accurately meters the amount of grain required for a single preform. During the baking cycle, the rotary housing rotates to align with an outlet and to feed the metered charge of grain to a waiting grain transfer unit. The grain transfer unit shuttles each charge of grain from the grain supply unit to the lower mold while in the mold-open condition.

The grain transfer unit is operated by two pulse motors—one driving the unit into and out of the open mold and the other driving the underlying plate away from the open mold so as to deliver the cereal charge. After delivery, the grain carrier and the underlying plate are re-united and positioned under the outlet of the grain supply unit to receive the next charge of cereal grain. The grain transfer unit is closely monitored by several sensors, which sensors ensure that the sequencing is adhered to and, upon deviation therefrom, halts operations.

The grain transfer unit has a ferrous impurity removal device. The device removes ferrous impurities by magnetic means and removes the impurities from the cereal grain charge.

The main drive unit drives the main cam which defines the open-mold portion and the closed-mold portion. A second cam or open cam is also driven by the drive unit. If, upon the completion of a baking cycle, the mold does not open normally, as described above, the open cam engages the pressure arm which, in turn, forces the pressure arm to life the upper mold away from the lower mold.

The electronic controller of this invention besides monitoring the numerous interrupts built into the system, presented in greater detail hereinbelow, also provides advanced programmable heater controls. The temperature is regulated to compensate for lower power supply variation and for thermal losses while the mold is in the open condition.

The expanded grain cake machine of this invention provides numerous advantages over prior art machines largely attributable to the added control features described herein. In this machine, the trajectory of the molded preform is reproducible from one preform ejection to another by ensuring that the grain charge delivered to the lower cavity of the mold is: (1) accurately metered; (2) distributed evenly in the lower cavity; (3) placed into a preheated mold to compensate for thermal loss during mold-open phase; (4) subjected to a temperature controlled environment which factors in variations in local power supplied; and, (5) exposed during processing to the same amount of thermal energy.

OBJECTS AND FEATURES OF THE INVENTION

It is an object of the present invention to provide a machine for producing expanded-grain cakes that is accurately controlled and is equipped with interrupts for operator safety.

It is another object of the present invention to meter the charge of cereal grain with high precision and repeatability and to evenly distribute the charge in the mold cavity.

It is yet another object of the present invention to provide a clamping arrangement for the mold unit which is adjustable and secure against gases at high pressure leaking from the closed mold.

It is a yet further object of the present invention to provide separate motors for grain supply functions and for mold unit operation to simplify construction and enhance reliability.

It is a feature of the present invention to control preheating and operational temperatures to form the correct size and shape of the expanded product.

It is yet another feature of the present invention to check all functions with a digital controller and automatically stop upon the occurrence of any abnormal operation.

Other objects and features of the invention will become apparent upon reading the detailed description which follows.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

The preferred embodiment is only one illustrative example and rather than limiting the bounds of the present invention, those skilled in the art will appreciate that various modifications, additions and substitutions are possible, without departing from the scope and spirit of the present invention. An initial general description provides a broad outline of the machine.

Figure 1:
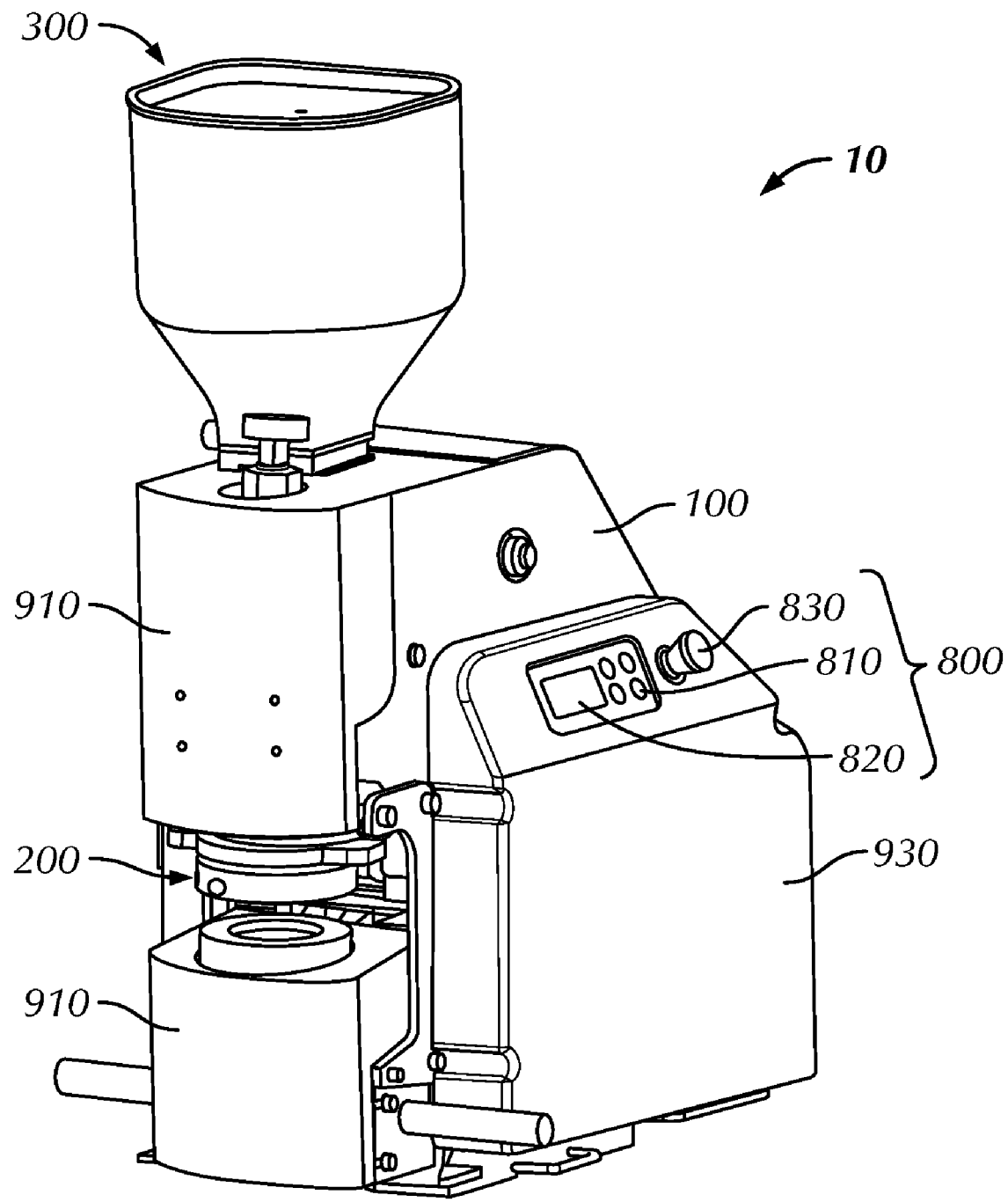
FIG. 1 is a perspective view showing the machine for producing expanded-grain cakes of the present invention.
Figure 2:
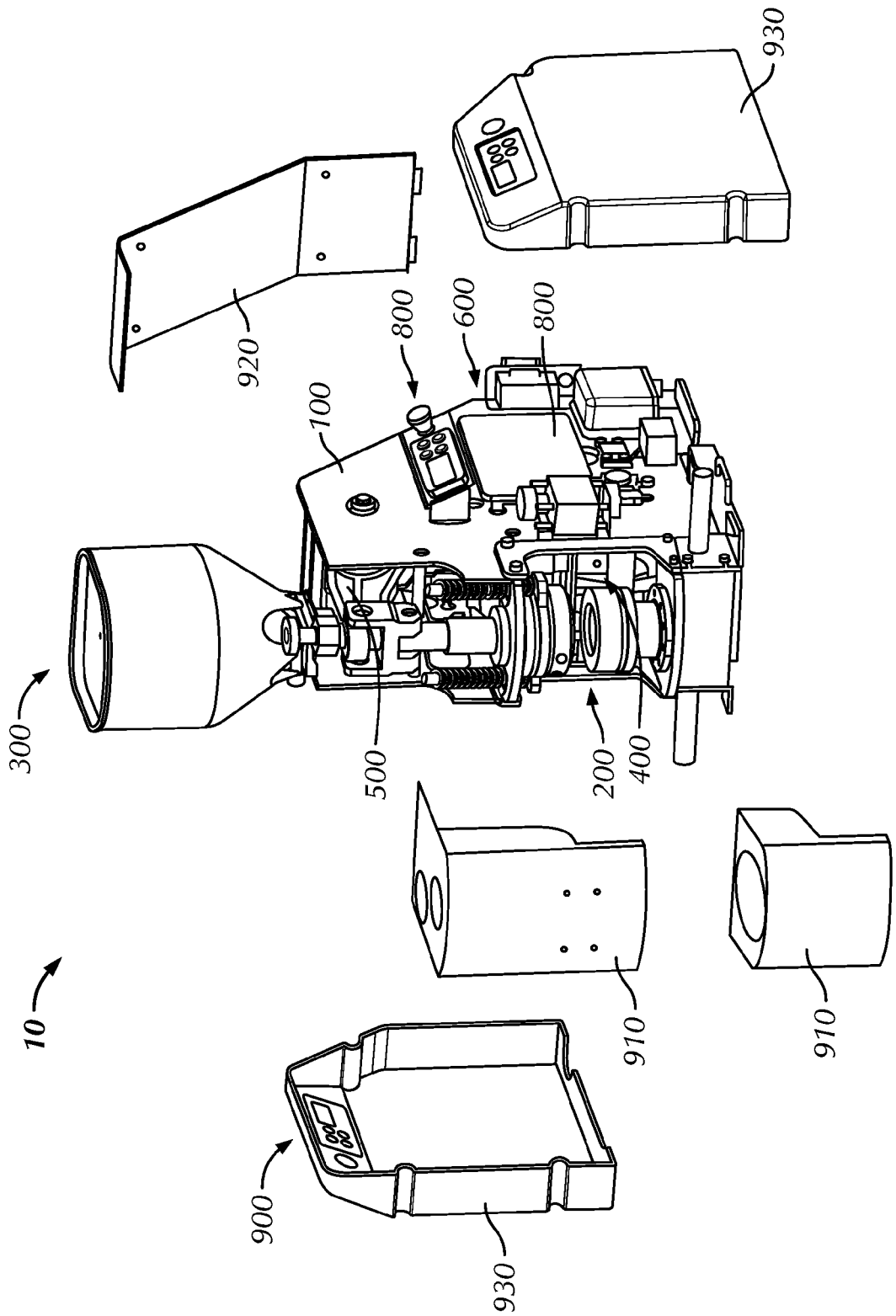
FIG. 2 is an exploded perspective view of the machine of FIG. 1.

Referring now to FIGS. 1 and 2, the expanded-grain cake machine 10 of the present invention is shown and the major subassemblies thereof are first described. The specific embodiment shown is constructed on a main frame or chassis 100. Mounted thereon is a mold unit 200 into which grain is fed from the grain supply unit 300 and the grain transfer unit 400. In processing the expanded-grain cake, a mold pressure arm 500 is cycled to and from the mold unit 200 by drive unit 600 and an open cam 700. The processing is controlled by a control unit 800 described in more detail hereinbelow. The machine 10 is protected by cover components 900.

The base frame or chassis 100 forms the general framework of the machine 10 and is constructed to house the components and subcomponents of the device hereof.

Figure 3:
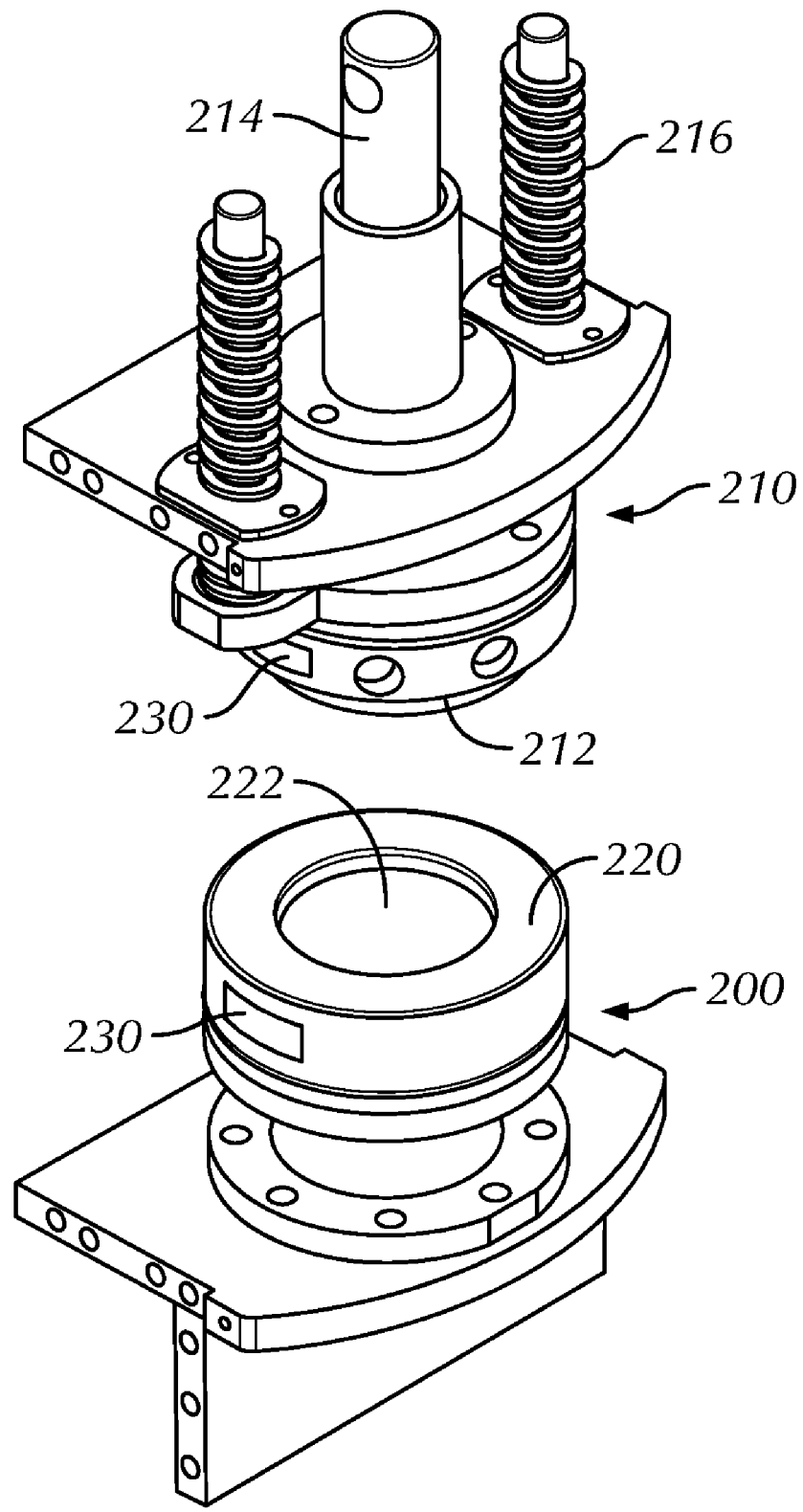
FIG. 3 is a perspective view of the mold omit of the machine of FIG. 1.

The mold unit 200 shown in detail in FIG. 3, is disposed in the front portion of the installation space of the frame 100. The mold unit 200 includes upper and lower molds 210 and 220, respectively. The mold unit 200 is constructed to receive a charge of cereal grains therewithin and, as described in greater detail below, during the mold closed portion of the processing cycle, to apply heat and pressure thereto, and during the open portion of the processing cycle to eject the molded cereal grain cake. The application of heat converts the moisture content of the cereal grains to entrapped steam, expands to a predetermined size as the admixture reaches ambient pressure.

The grain supply or hopper unit 300 is mounted on the upper portion of the base frame 100 and feeds by gravity a predetermined amount of cereal grain to the mold unit 200 for each molding portion.

The grain transfer unit 400 transfers cereal grains from the hopper 300 to the mold unit 200.

After placing a charge of grains in the mold, the mold pressure unit 500 vertically compresses the mold unit 200, and, at the conclusion of the baking phase of the cycle, separates the upper mold 210 and the lower mold 220 from one another. Preferably, the mold pressure unit 500 moves the upper mold 210 reciprocally along a substantially vertical pathway with respect to the lower mold 220.

The drive unit 600 transmits rotational force to the mold pressure unit 500. During a single rotation of the drive unit 600, the working end of the mold pressure unit 500 is moved reciprocally along a substantially vertical path and sequentially provides a clamping force to and removes the same from the mold unit 200.

The cam 510 is rotated by the drive unit 600. The cam 510 is configured so that a portion of the circumference thereof radically protrudes from the rotating shaft. The configuration thereby defines two time periods or phases, namely, (1) a baking phase during which heat and pressure are applied to the cereal grain admixture, and (2) a mold open phase during which a preform or molded cake is ejected, the mold is recharged with cereal grain, and the mold is returned to the closed state. The configuration of the cam 510 and the speed of the drive unit 600 determine the time apportioned to each phase.

After the supplied cereal grains are molded into a preform, the cam 510 is positioned so that the pressure exerted upon the mold unit 200 by the mold pressure unit 500 is released.

The control unit 800 measures the temperature of the mold unit 200, monitors the position of the grain receptor well 332 to ensure grain delivery, monitors the position of the grain transfer unit 400, monitors the position of the mold pressure arm 520 and the upper mold 210, and measures the required preset conditions for the operation of the machine for producing expanding grain cakes of this invention.

If any one of the monitored measurements and/or the preset conditions does not meet the requirements, the control unit 800 interrupts the operation of the drive unit 600, the grain supply unit 300, and the grain transfer unit 400 and issues a warning signal.

Because the control interrupts operations when the machine 10 is not within the preset conditions, malfunctioning is prevented. This control unit 800 intervention prevents components from being damaged, cereal grains from being burned, and cakes failing to expand because of insufficient entrapped steam, etc.

The cover unit or housing 900 encloses the base frame 100 and protects the components installed in the base frame 100. Besides the cover unit 900 improving the aesthetic appearance of the machine 10, operating personnel are protected from moving parts, the housing protects the mold unit 200, the grain supply unit 300, the grain transfer unit 400, the mold pressure arm 500, the drive unit 600, the open cam 700 and the control unit 800 which are installed in the base frame 100.

Besides the interrupts provided by control unit 800, the control unit 800 upon measuring the required conditions continuously displays the temperature of the mold unit 200 and the level of the cereal grains present in the grain supply unit 300. A visual display of the selected amount of cereal grains supplied by the grain supply unit 300 is provided as is a position indicator of the grain transfer unit 400 relative to the mold unit 200. Some of these parameters may be adjusted by the operator during the course of processing.

The construction of the machine 10 is now explained in greater detail.

Referring now to FIG. 3, the mold unit 200 includes the upper mold 210, the lower mold 220 and heating elements 230.

While the lower mold 220 is rigidly mounted to the base 100, the upper mold 210 is flexibly coupled through coupling shaft 214 to the mold pressure arm 500. The mounting arrangement includes spring tensioner 216, which, when the mold pressure arm 500 is clamping the mold closed, is compressed thereby. Upon clamping release, the stored energy in the compressed spring throws the arm upwards.

The mold cavity is defined by the upper open portion 212 in the underside of upper mold 210 and the mating lower open portion 222 in the lower mold 220. With the mold unit 200 in an open condition, cereal grains are supplied to the lower open portion or grain receptor. Thereafter the mold is closed and, upon the application of heat, the cereal grains expand to fill the mold cavity and, in turn, entrap steam from the evaporating moisture content thereof. Thus, the mold cavity limits the initial grain expansion and defines the size and shape of a preformed grain cake. The preform further expands upon opening of the mold unit during the ejection therefrom. The further expansion results from the entrapped steam returning to ambient pressure.

The two heating elements 230 are respectively provided in the upper mold 210 and the lower mold 220. The heating elements 230 heat the upper and lower molds 210 and 220 and maintain the predetermined process temperature.

To compensate for heat losses during the mold open phase, the upper and lower molds 210 and 220 are heated by the heating elements 230 to an initial temperature higher than the temperature required during the normal baking process. This compensation for the heat loss experienced while the cavity is being refilled enables the system to return quickly to operating temperatures.

Figure 4:
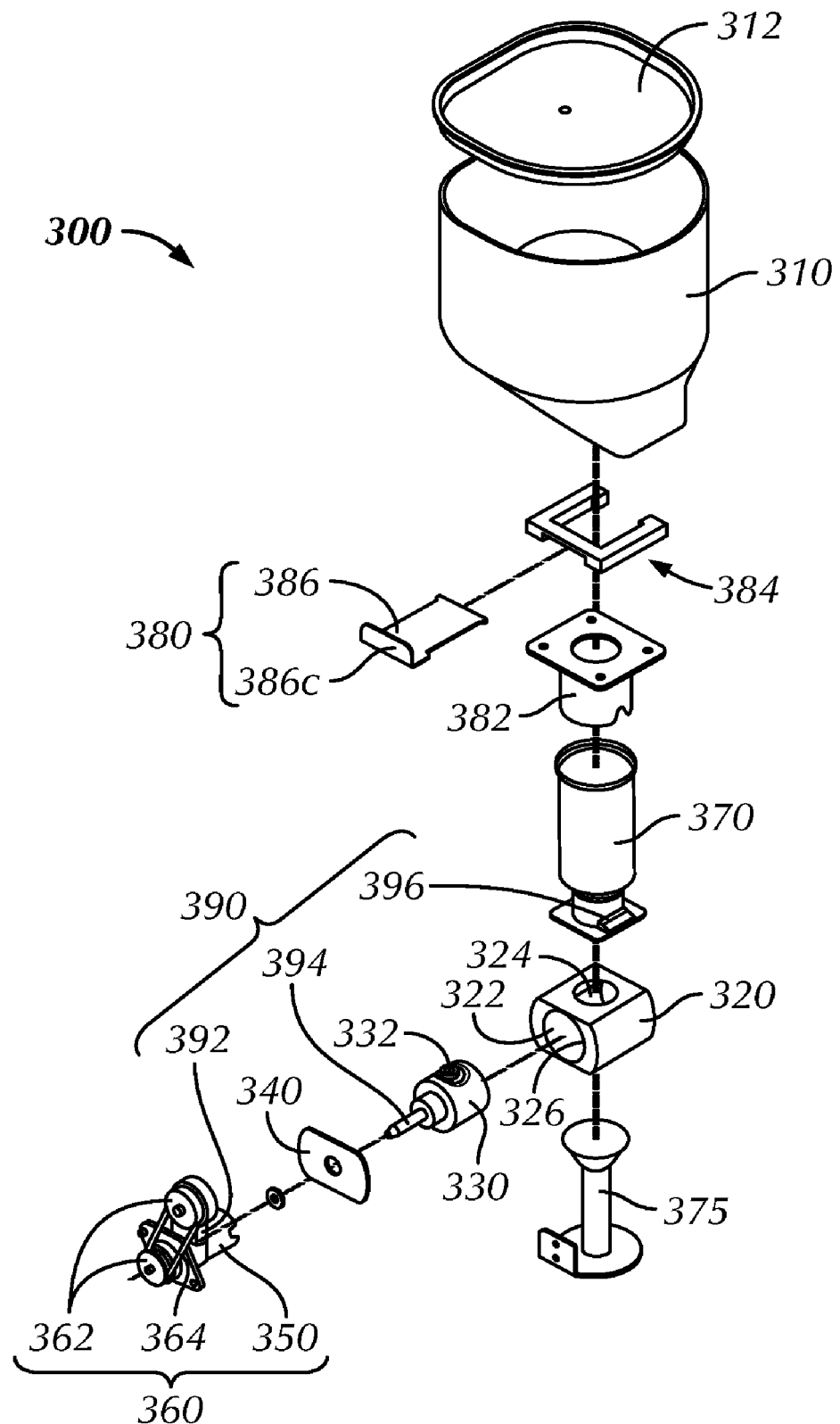
FIG. 4 is an exploded perspective view of the grain supply unit of the machine of FIG. 1.

Referring now to FIG. 4, the grain supply unit 300 is shown with blocking unit 380 and the grain storage hopper 310 of the grain supply unit 300. The grain supply unit 300 has a cover or lid 312 and functions as a storage vessel for cereal grains, from which vessel grain is gravity fed to the mold unit 200. The cereal grains move downwards from the grain storage hopper 310 through an opening which is formed in the lower end of the grain storage hopper 310.

A hopper connection tube 370 extends between the grain storage hopper 310 and the rotor housing 320 and is a conduit for the cereal grain supply from the grain storage hopper 310 to the rotor housing 320. The hopper connection tube 370 is tapered at the lower end thereof so that the outlet is equal to or smaller than inlet 324 of rotor housing 320.

A second supply pipe or funnel 375 provides a conduit for the charge of cereal grain supplied from the rotor housing 320 to the grain transfer unit 400. The supply funnel 375 is configured such that the inner surface of the upper end thereof is inclined from the bottom to the top in a direction away from the center axis thereof.

The supply funnel 375 communicates with outlet 326 of the rotor housing 320 and supplies cereal grains from the rotor housing 320 to the grain transfer unit 400. The blocking unit 380 is disposed between the grain storage hopper 310 and the hopper connection tube 370 and is constructed to selectively interrupt the flow of cereal grain from the grain storage hopper 310 to the hopper connection tube 370.

When the lid 312 of the grain storage hopper 310 is opened to load cereal grain into the hopper 310 or remove cereal grain from the hopper 310, the blocking unit 380 closes the conduit and halts the transfer of cereal grain from the grain storage hopper 310 to the hopper connection tube 370. The sensor unit 390 has three sensors—a first sensor 392, a second sensor 394 and a third sensor 396. The first sensor 392 is mounted adjacent motor 350 and measures the angular position of the rotor driving motor 350 shaft.

The second sensor 394 is mounted adjacent rotor 330 and measures the angular position of supply rotor 330. The third sensor 396 monitors the hopper connection tube 370 to determine whether it is filled with cereal grains.

The angular position data from the first sensor 392 and the second sensor 394 and grain supply available/unavailable data from the third sensor 396 are transferred to the control unit 800. The control unit 800 compares the transferred values to the reference values and controls the grain supply unit 300.

In the present invention, the grain storage hopper 310 is made of transparent material. This allows the user to observe the remaining amount of cereal grain in the hopper 310 and to determine when cereal grain should be added.

Figure 5:
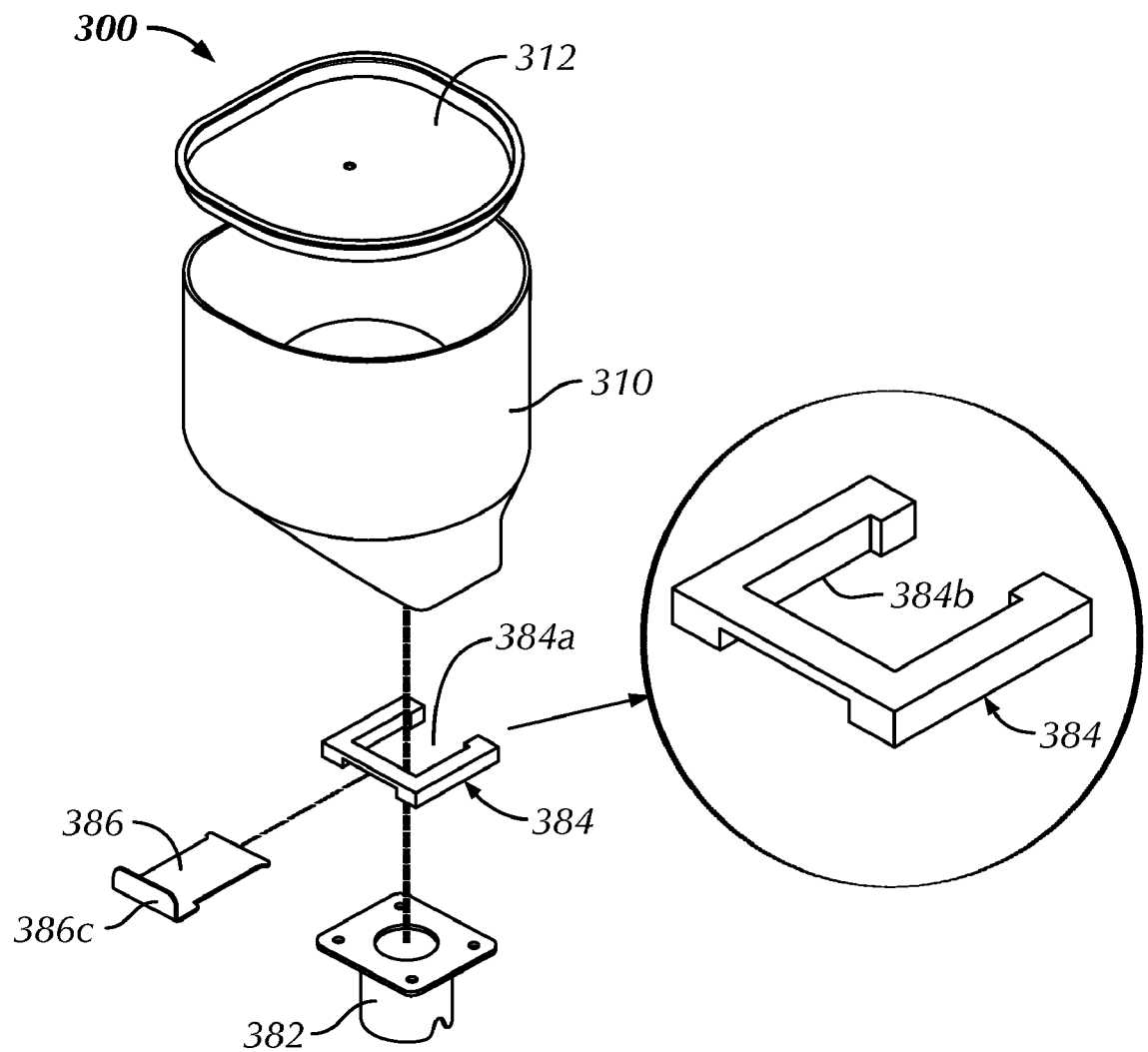
FIG. 5 is an exploded perspective view of the blocking unit of the grain supply unit of FIG. 4.

Referring now to FIG. 5, the blocking or shutoff unit 380 includes a first supply pipe or hopper outlet pipe 382, a bracket 384 and a blocking plate 386.

The hopper outlet pipe 382 is fitted to the upper end of the hopper connection tube 370 to transfer cereal grain from the grain storage hopper 310 into the hopper connection tube 370. The bracket 384 is disposed between the upper end of the hopper outlet pipe 382 and the grain storage hopper 310.

A supply opening 384a extending through the central portion of the blocking bracket 384 allows gravity flow of cereal grain therethrough. A guide slot 384b in the interior surface of bracket 384 is dimensioned to house the blocking or shutoff plate 386 therewithin. The shutoff plate 386 is movably inserted into the guide slot 384b to selectively open or close opening 384a. A handle 386c shown at the outer end of the shutoff plate 386 allows the user to slide the shutoff plate 386 back and forth along guide slot 384b.

The shutoff plate 386 is configured with nonremoval tabs to prevent the removal thereof from the blocking bracket 384. Similarly, the shutoff plate 386 is configured with limit tabs which, when the plate 386 completely closes the supply opening 384a, the limit tabs stop the shutoff plate 386 travel at the blocking bracket 384 and reach the insertion endpoint. Because of this configuration, this structure of the blocking unit 380, the shutoff plate 386 is selectively positionable to open and close the supply opening 384a without being removed from the blocking bracket 384.

In the present invention, the blocking unit 380 is removably coupled to the hopper connection tube 370, and with the shutoff plate 386 closed, the grain storage hopper 310 along with the blocking unit 380 are removable from the hopper connection tube 370. Such a configuration simplifies loading cereal grain into the grain storage hopper 310.

Figure 6:
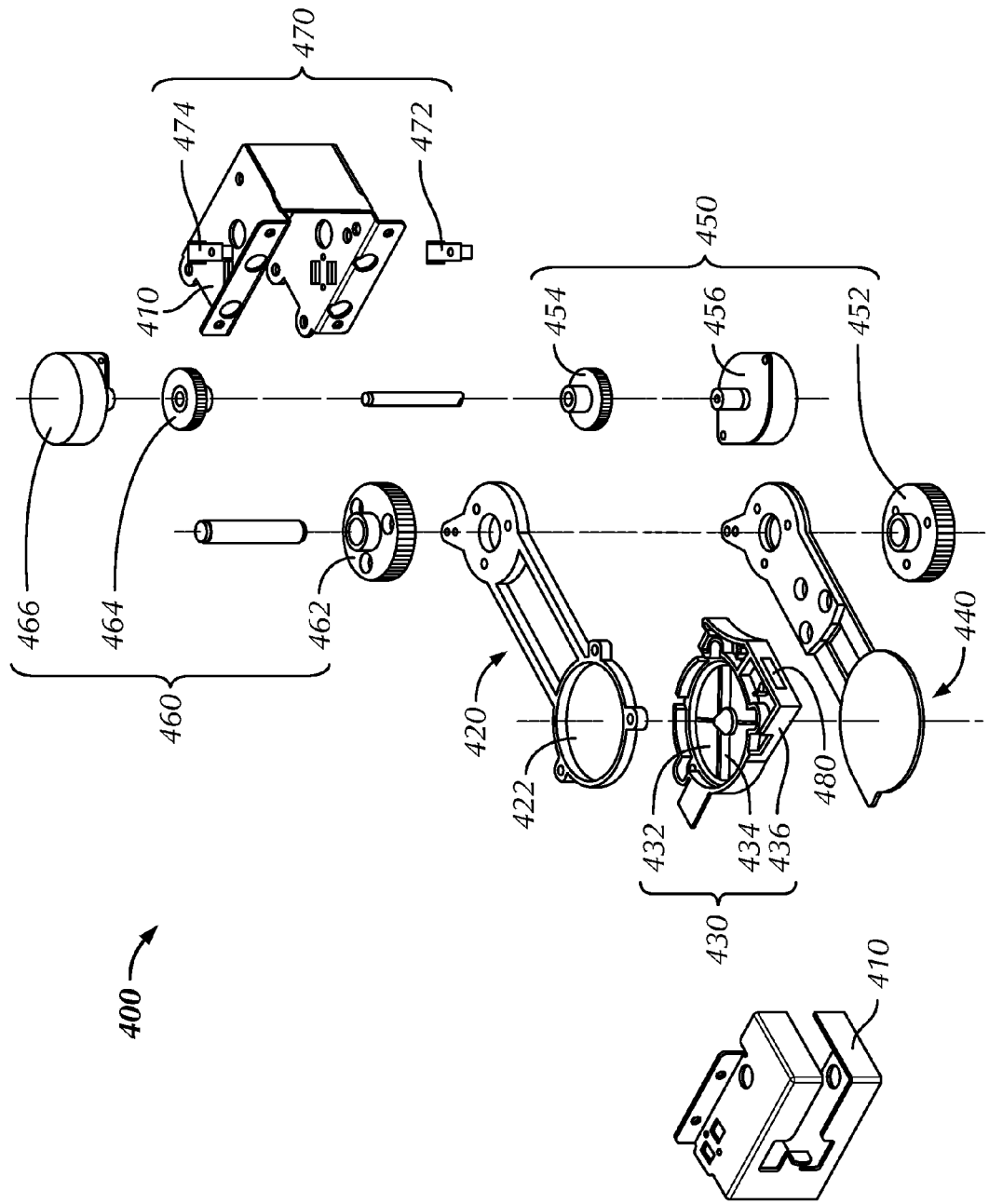
FIG. 6 is an exploded perspective view of the grain transfer unit shown in FIG. 2.

As shown in FIG. 6, a grain transfer unit 400 is housed in a mounting bracket 410. The grain transfer unit 400 is constructed to include a grain carrier 420 and a grain distributor 430. The grain carrier 420 and the grain distributor 430 are driven together by a first pulse motor or drive unit 460. The grain transfer unit 400 has a separately driven plate or support 440 which is driven by a second pulse motor or drive unit 450.

The mounting bracket 410 is housed in chassis 100. The grain carrier 420 and distributor 430 are rotatably coupled at a first end thereof to the inner surface of a top plate of the mounting bracket 410. An inlet 422 is formed through a second end of the grain carrier 420 enabling the carrier to receive metered amounts of grain from the grain supply unit 300.

The grain distributor 430 is coupled to the second end of the grain carrier 420 and has an outlet 432 permitting the gravity flow of grain therethrough. The grain distributor 430 has mounted therewithin a guide and guide blade assembly 434 for evenly distributing the grain on plate 440 at outlet 432.

Furthermore when the grain transfer unit 400 is rotated into position over lower mold 220 of mold unit 200, an actuator 436 of the grain distributor 430 causes the plate 440 to rotate and release the distributed and metered grain through outlet 432 to lower mold 220.

After transfer, the actuator 436 reunites with plate 440 and the empty grain carrier 420 along with grain distributor 430. Then and places the unit is positioned to receive another metered charge of grain from the grain receptor well 332 of grain supply unit 300.

The plate or support 440 is provided under the grain distributor 430 and has the same rotational track as that of the grain distributor 430. In addition, the plate 440 is rotatably coupled at the first end thereof to the inner surface of a bottom plate of the mounting bracket 410 such that the first end of the plate 440 is coaxial with the first end of the grain distributor 430. A second end of the plate or support 440 selectively opens or closes the outlet 432.

The first drive unit 450 includes a first motor 456, a first drive gear 454 and a first driven gear 452. The first motor 456 generates rotational force and is housed in mounting bracket 410.

The first driven gear 452 is provided under the first end of the plate 440. The drive train in this embodiment is comprised two gears—drive gear 454 and driven gear 452—having different diameters. This gear arrangement transmits the rotational force from the drive gear 454 of the first pulse motor 456 to the first driven gear 452 and, in turn, to the plate 440.

The second chive unit 460 includes a second pulse motor 466, a second drive gear 464—fitted over the output shaft—and a second driven gear 462. The second motor 466 is fastened to the mounting bracket 410 and generates rotational force to grain carrier 420.

The second driven gear 462 is provided on the first end of the grain carrier 420. The second drive gear 464 is mounted on the output shaft of second pulse motor 466 and transmits the rotational force from the drive gear of the second pulse motor 466 to the second driven gear 462.

The drive units 450 and 460 are controlled by the control unit 800. The plate 440 is rotated by the first drive unit 450. The grain carrier 420 is rotated by the second drive unit 460.

The grain carrier sensor unit 470 includes a first sensor 472 and a second sensor 474 which are respectively disposed on the bottom and top plates of the mounting bracket 410. In detail, the first sensor 472 is provided under the bottom plate of the mounting bracket 410. The first sensor 472 measures a rotation angle of the first drive unit 450 and a position of the plate 440 and transmits the measured values to the control unit 800.

The second sensor 474 is provided on the top plate of the mounting bracket 410. The second sensor 474 measures a rotation angle of the second drive unit 460 and a position of the grain carrier 420 and transmits the measured values to the control unit 800.

The operation of the grain transfer unit 400 is now explained. The grain carrier 420 and the plate 440 are initially united the one with the other to form a vessel for receiving a metered charge of grain and are disposed below the grain supply unit 300. In this state, cereal grains supplied from the grain supply unit 300 are held by the grain transfer unit 400 for the next cycle.

After the cereal grains are deposited in the grain transfer unit 420 the plate or support 440 is rotated by the first drive unit 450 away from the cereal grain supply unit 300 to the mold unit 200. When the plate or support 440 rotates, the actuator 436 of the grain distributor 430 is carried thereby and the entire grain transfer unit 400 is rotated.

Subsequently, the plate or support 440 along with the grain carrier 420 is positioned above the cavity 222 of the lower mold 220. The first drive unit 450 thereafter rotates the plate or support 440 towards the grain supply unit 300. Then, the outlet 432 becomes open, so that the cereal grains which have been evenly distributed in the grain carrier 420 are gravity fed to mold cavity 222. Subsequently, the grain carrier 420 is rotated towards the grain supply unit 300 by the second drive unit 460 and thus positioned onto the plate or support 440, thus completing a single grain transferring process of the grain transfer unit 400.

During the grain transfer process, the first sensor 472 and the second sensor 474 respectively detect the positions of the plate or support 440 and the grain carrier 420. If an error occurs, the control unit 800 stops the operation of the expanded grain cake machine.

Figure 7:
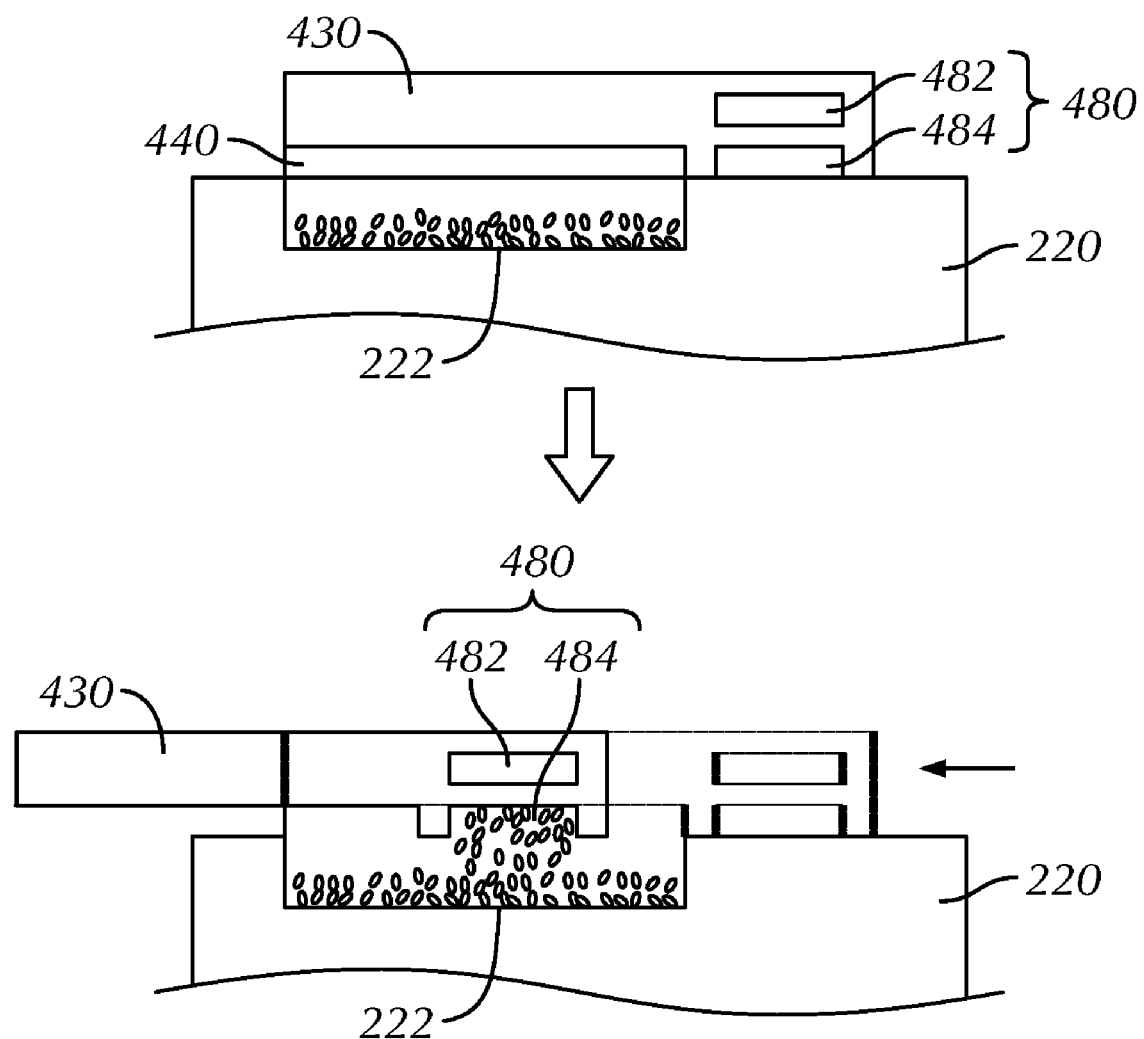
FIG. 7 is a schematic view of the ferrous impurity removal of the grain transfer unit shown in FIG. 6.

Referring now to FIG. 7, a ferrous impurity removal unit 480 is mounted adjacent actuator 436 in the grain distributor 430. The ferrous impurity removal unit 480 has a magnet 482 to attract and retain ferrous impurities and an impurity collection site 484 therebelow.

Ferrous impurities may from time-to-time be imparted to the grain supply and enter the mold cavity 222 of the lower mold 220. In the present invention, the ferrous impurity removal unit 480, which rotates along with the grain transfer unit, can collect such ferrous impurities and remove the ferrous impurities from the grain supplied prior to the grain cake formation.

Figure 8:
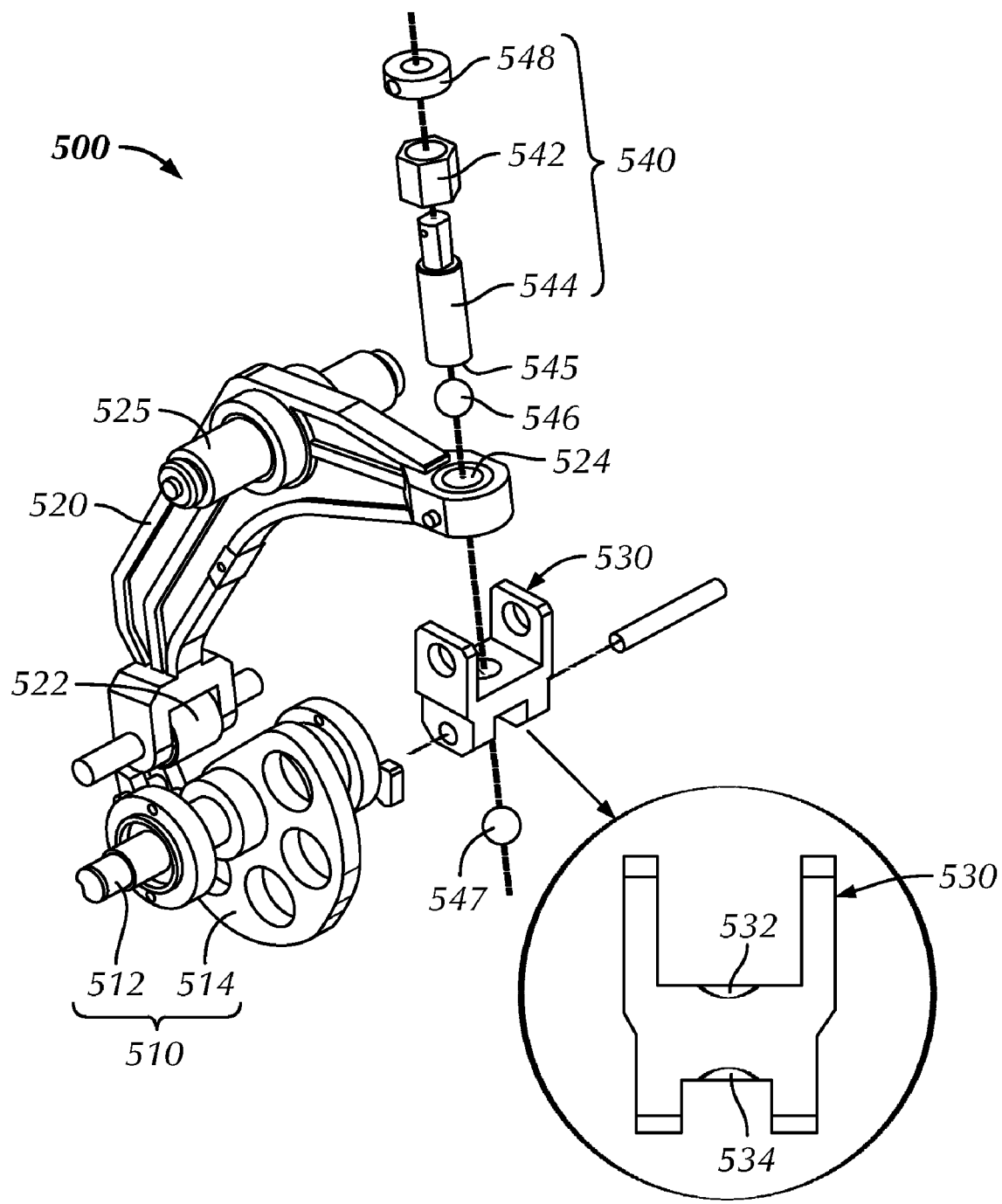
FIG. 8 is an exploded perspective view showing the cam-operated, mold pressure unit of the machine of FIG. 2.

Referring now to FIG. 8, the mold pressure unit 500 is shown and cam unit 510, a pressing arm 520, a rotary block 530 and a pressure adjustment unit 540. During the closed-mold phase of operation, heat is applied to the mold contents and evaporates and entraps the moisture content of the charge of grain. The maintenance of pressure in the mold cavity utilizes the gases formed during this phase as propelling means for the ejection of the preform and as an expansion or blowing means to expand the preform to a cake of the desired final size.

The cam unit 510 includes a cam shaft 512 and a cam 514. The cam shaft 512 is rotatably supported by the frame 100 and is rotated by the main machine drive unit 600.

The cam 514 is fixedly mounted on the cam shaft 512 and rotates with the cam shaft 512. The cam 514 is configured such that a distance travelled by the circumference thereof and by the cam shaft 512 varies along the circumferential direction. The cam 514 rotates the pressure arm 520.

The pressure arm 520 is rotatably supported at a medial portion thereof by the frame 100. A cam follower 522 is provided on a first end of the pressure arm 520, and at a second end of the pressure arm 520, a pivot or mounting arrangement 525 is provided for the pressure adjustment unit 540.

As the cam follower 522 provided at the first end of the pressure arm 520 traces the circumference of the cam 514, the pressure arm 520 rotates around the pivot 525 thereof. Thereby, the second end of the pressure arm 520 moves along a predetermined path which alternates between maintaining pressure within the mold and releasing the pressure therewithin.

The rotary block of coupling 530 is rotatably mounted below the second end of the pressure arm 520. The rotary block 530 moves concurrently with the second end of the pressure arm 520. As described in further detail hereinbelow, the second end of the pressure arm is flexibly coupled to the rotary block 530 through pressure adjustment unit 540.

In other words, when contact between the cam follower 522 is released at the first end of the pressure arm 520, the first end of pressure arm 520 falls downwardly and the second end of the pressure arm 520 is raised upwardly. The upward movement, which carries with it rotary block 530 and the upper mold 210, is aided by the pressure build up in the cavity. The rotary block 530 on the second end of the pressure arm 520 is structured to move upwardly and downwardly without being removed from pressure arm 520.

Furthermore, a hemispherical pressing depression 532 is formed in the upper surface of the rotary block 530. A lower end of the rotary block 530 is rotatably coupled to the upper mold 210. As such, the rotary block 530 couples the pressure arm 520 to the upper mold 210, permitting the upper mold 210 to move reciprocally along a substantially vertical pathway resulting from pressure arm 520 rotation being translated into linear movement.

The pressure adjustment unit 540 is provided in the second end of the pressure arm 520 and functions to control the end play of the rotary block 530 As the end play of the rotary block 530 is minimized, the pressure which the upper mold 210 and the lower mold 220 retain in the mold cavity is maximized.

The pressure adjustment unit 540 includes a stationary nut 542, and adjustment rod 544, a ball 546 and an adjustment knob 548. The pressure adjustment unit 540 is disposed in aperture 524 of the pressure arm 520 and an internal thread on the inner surface of the stationary nut 542 provides for a fine adjustment of the end play.

An external thread corresponding to the internal thread of the stationary nut 542 is formed on the circumferential outer surface of the adjustment rod 544. Thus, the adjustment rod 544 is threadedly mounted to the stationary nut 542 and the pressure adjustment unit is movable towards and away from the rotary block 530.

Furthermore, a hemispherical seat 545 is formed in the surface of the lower end of the adjustment rod 544. The upper portion of ball 546 is seated into the hemispherical seat 545 and the lower portion of the ball 546 is seated in the hemispherical seat 532 of the rotary block 530. Therefore, the rotary block 530 coupling of the pressure arm 520 to the upper mold 210 is maintained through the adjustment rod 544 in a manner similar to that of a ball and socket joint.

Upon rotation of the adjustment knob 548 on the upper end of the adjustment rod 544, the adjustment rod 544 rotates along the internal thread of the stationary nut 542 and moves in the longitudinal direction. Thereby, the end play between adjustment rod 544 and the rotary block 530 is adjusted.

The longitudinal direction of the adjustment rod 544 means a direction parallel to an extension line passing both through the center of the upper and lower ends of the adjustment rod 544. Thus, the position of the adjustment rod 544 is adjusted by rotating the adjustment know 548. Thereby, the adjustment in position of the rotary block 530 varies the end play of the pressure arm and determines the pressure build up in mold 200. The pressure adjustment unit 540 precisely adjusts the pressure retained in the mold 200.

In the present embodiment, an additional hemispherical pressure arm seat 534 is formed in the lower surface of the rotary block 530. A ball 547 is seated into the hemispherical pressure arm seat 534 and then the movement of the block 530 with respect to the upper mold 210 is similar to that of a ball and socket joint. A hemispherical seat is formed in the upper surface of the upper mold 210 for accommodating ball 547.

Because of the manner in which balls 546 and 547 are mounted on the upper and lower surfaces of the rotary block 530, the rotary block 530 mimics movement of a ball and socket joint. The rotation of the pressure arm 520 is converted into linear movement above the upper mold 210 and, simultaneously, the required pressure is retained in the mold cavity by the positioning of the pressure arm 520. The pressure meets that required for reliably ejecting the molded preform from the mold 200 and having the preform follow a substantially predictable trajectory.

Figure 9:
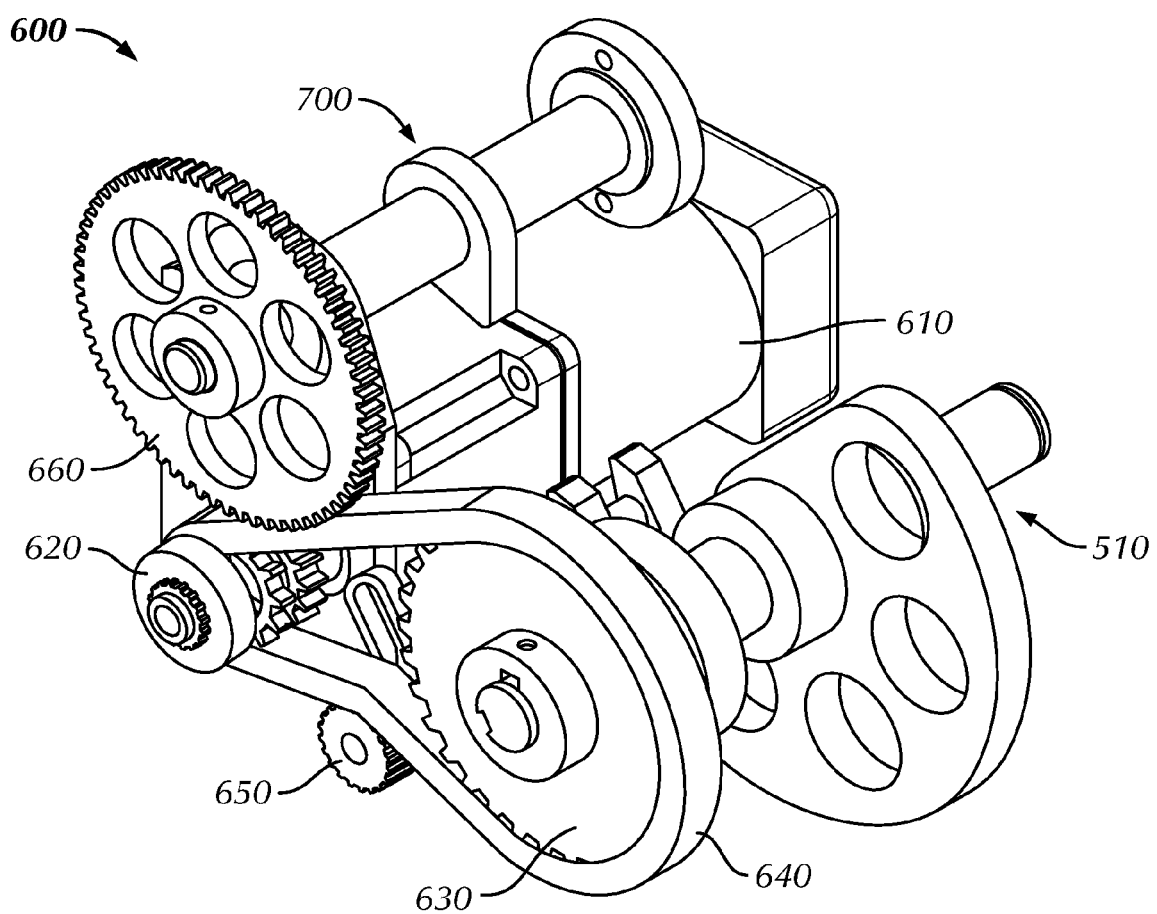
FIG. 9 is a perspective view showing the drive unit of the machine of FIG. 2.

Referring now to FIG. 9, the drive unit 600 is constructed with a drive motor 610, a drive sprocket 620, a first driven sprocket 630, a chain 640, a tension sprocket 650 and a second driven sprocket 660.

The drive motor 610 is supported by the frame 100. The drive sprocket 620 is rotated by the drive motor 610 and includes at least two gears having different diameters. The first driven sprocket 630 is mounted on the mold pressure unit 500 and transmits rotational force to the mold pressure unit 500 which operates during the mold-closed phase of the machine processing cycle. The chain 640 connects the first driven sprocket 630 to the drive sprocket 620 and transmits rotational force from the drive sprocket 620 to the first driven sprocket 630 thereby operating the mold pressure unit 500.

The chain 640 connects one of the gears of the drive sprocket 620 to the first driven sprocket 630 to transmit rotational force therebetween.

The tensioning sprocket 650 presses a portion of the chain 640 towards a line extending from the center of the drive sprocket 620 to the center of the first driven sprocket 630, and maintains the tension of the chain 640. Thereby, the rotational force of the drive motor 610 is uniformly transmitted to the first driven sprocket 630.

The second driven sprocket 660 connects to the open cam 700, engages with another gear of the drive sprocket 620, and transmits the rotational force from the drive sprocket 620. The open cam 700 imitates operations during the mold-open phase of the machine operating cycle.

The open cam 700 is rotated by the same rotational force as the rotational force which is transmitted to the mold pressure unit 500. Thus, after the molded preform is ejected from the mold 200, the upper mold 210 moves upwards to facilitate the recharging of the mold cavity, the cam follower 522 disengages from cam 514 allowing the mold pressure unit 500 to rotate counterclockwise and to move the upper mold 210 upwards.

Referring now to FIGS. 1 and 2, the cover unit 900 is constructed with a front cover 910, a rear cover 920 and side covers 930.

The cover unit 900 shields the machine operators from access to the major moving parts of the machine 10 and thereby creates a safer work environment. The front cover 910 is assembled to the front portion of the frame 100 and protects the mold unit 200. The front cover 910 comprises upper and lower portions which protect the upper mold 210 and the lower mold 200, respectively.

The rear cover 920 is disposed on the rear portion of the frame 100 and protects the machine from impurities, such as dust and water.

The side covers 930 on opposite sides of the frame 100 house the control unit 800 and protect the grain transfer unit 400.

The side covers 930 are made of acrylonitrile butadiene styrene (ABS) material which absorbs external shocks and reduces the weight of the machine 10.

The control unit 800 has operating controls 810 for automatic (programmed) or manual control of machine 10. The control unit 800 provides for programmatic changes for the drive unit 600, the grain supply unit 300 and the grain transfer unit 400.

The control unit 800 further includes a screen 820 which displays the current operating conditions, reports malfunctions, or indicates a shortage in the supply of cereal grains. To maintain the productivity of the machine 10, the indicators may be either visual or audible signals.

The control unit 800 has an emergency button 830 which, when necessary, stops the operation of the drive unit 600, the grain supply unit 300 and the grain transfer unit 400 and provides additional safety provisions.

In the present invention, the heaters 230 are programmed and the initial temperature of the mold unit 200 is set by the control unit 800 at a level higher than that required during the mold closed phase. This compensates for heat loss when the mold is open. Thereafter, with the mold 200 closed the temperature is adjusted so that the total thermal energy required for the full cycle develops the entrained gases to eject the preform and, upon release, to expand the cake to the desired size. Thus, the present invention reliably prevents defective preform formation even for the first charge of grain processed.

The control unit 800 is provided on at least one of the opposite sides of the frame 100. Preferably, two control units 800 are respectively provided on the opposite sides of the frame 100 to facilitate access by the operator. The two control units 800 are duplicates of one another and any setting on one of the control units is reflected at the control unit on the opposite side.

Figure 10:
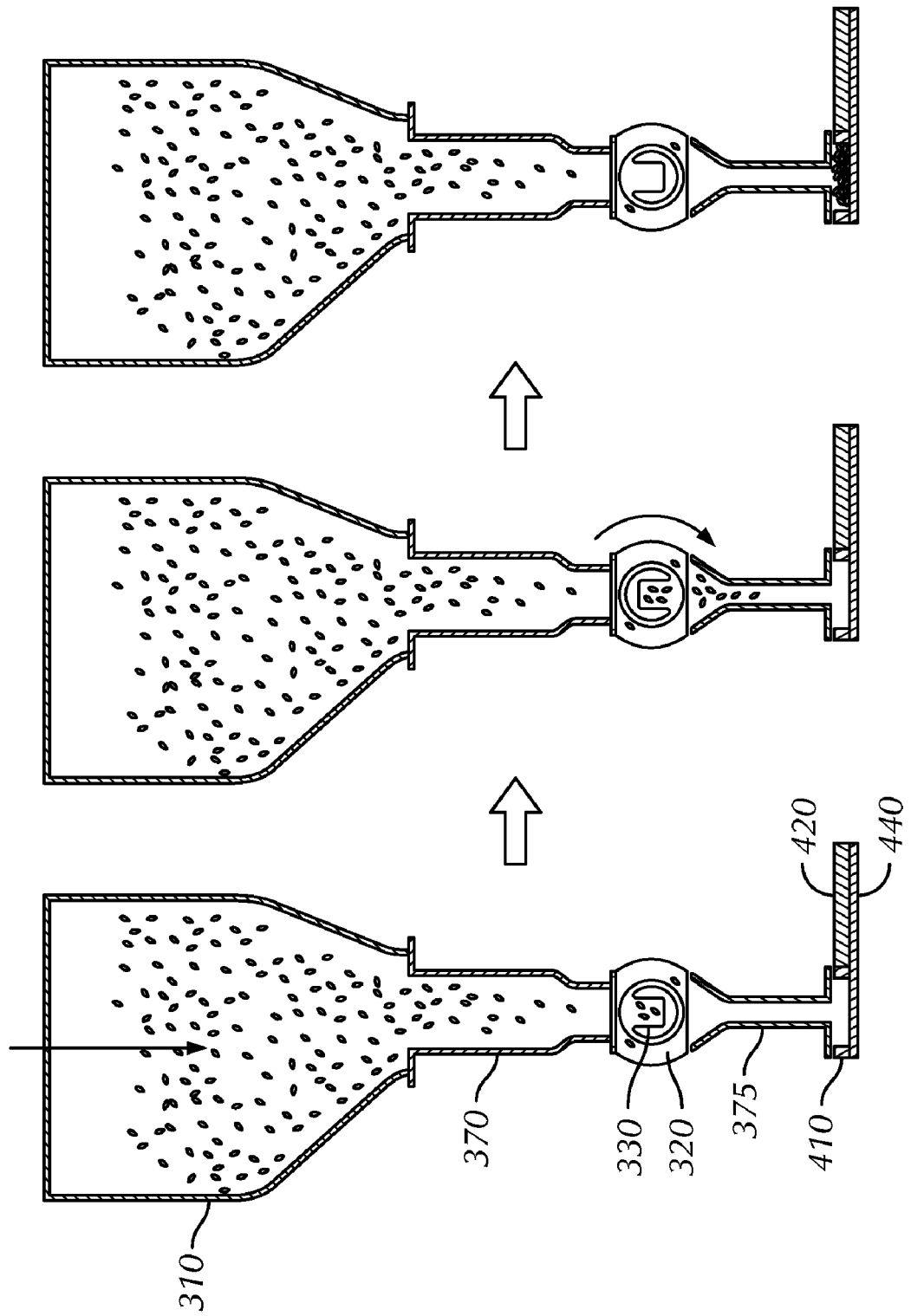
FIG. 10 are progressive schematic views of the grain supply operation of the grain supply unit of FIG. 4.
Figure 11:
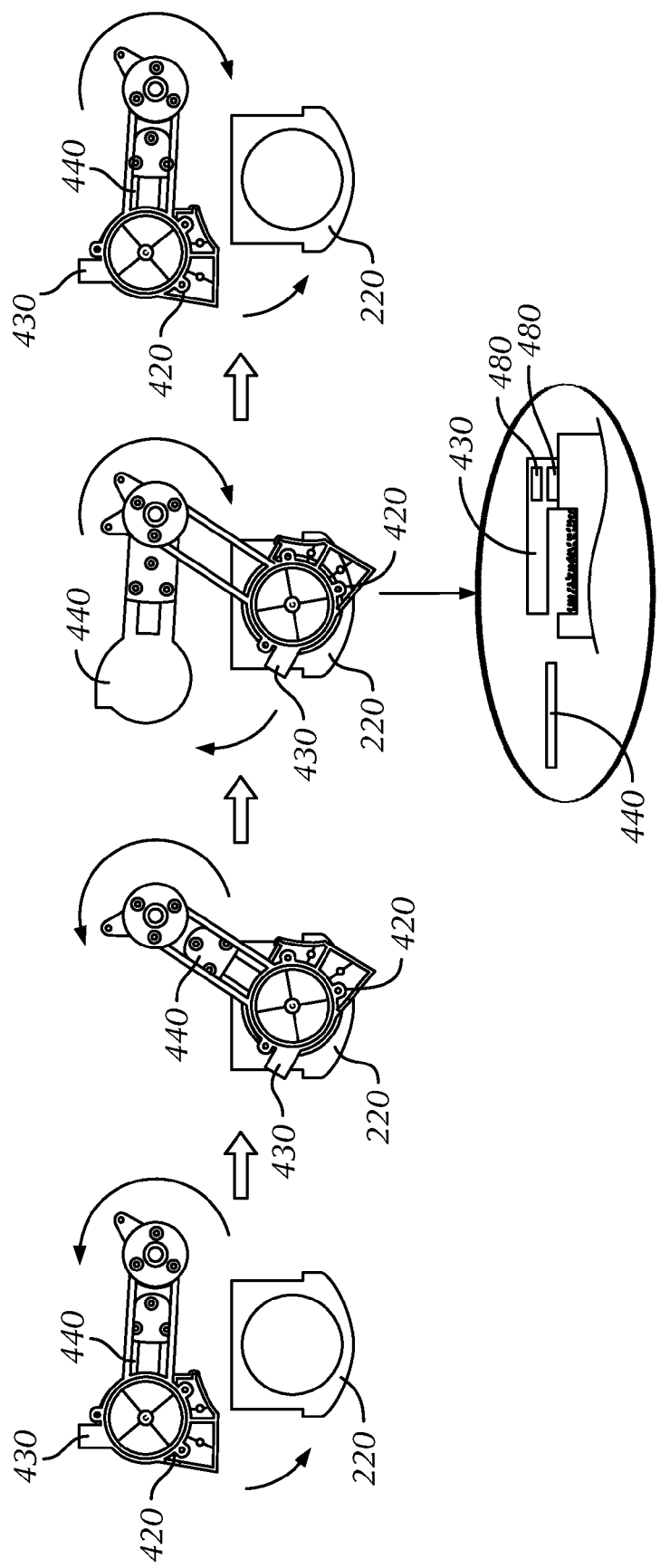
FIG. 11 are progressive schematic views of the grain transfer operation of the grain transfer unit of FIG. 6.
Figure 12:
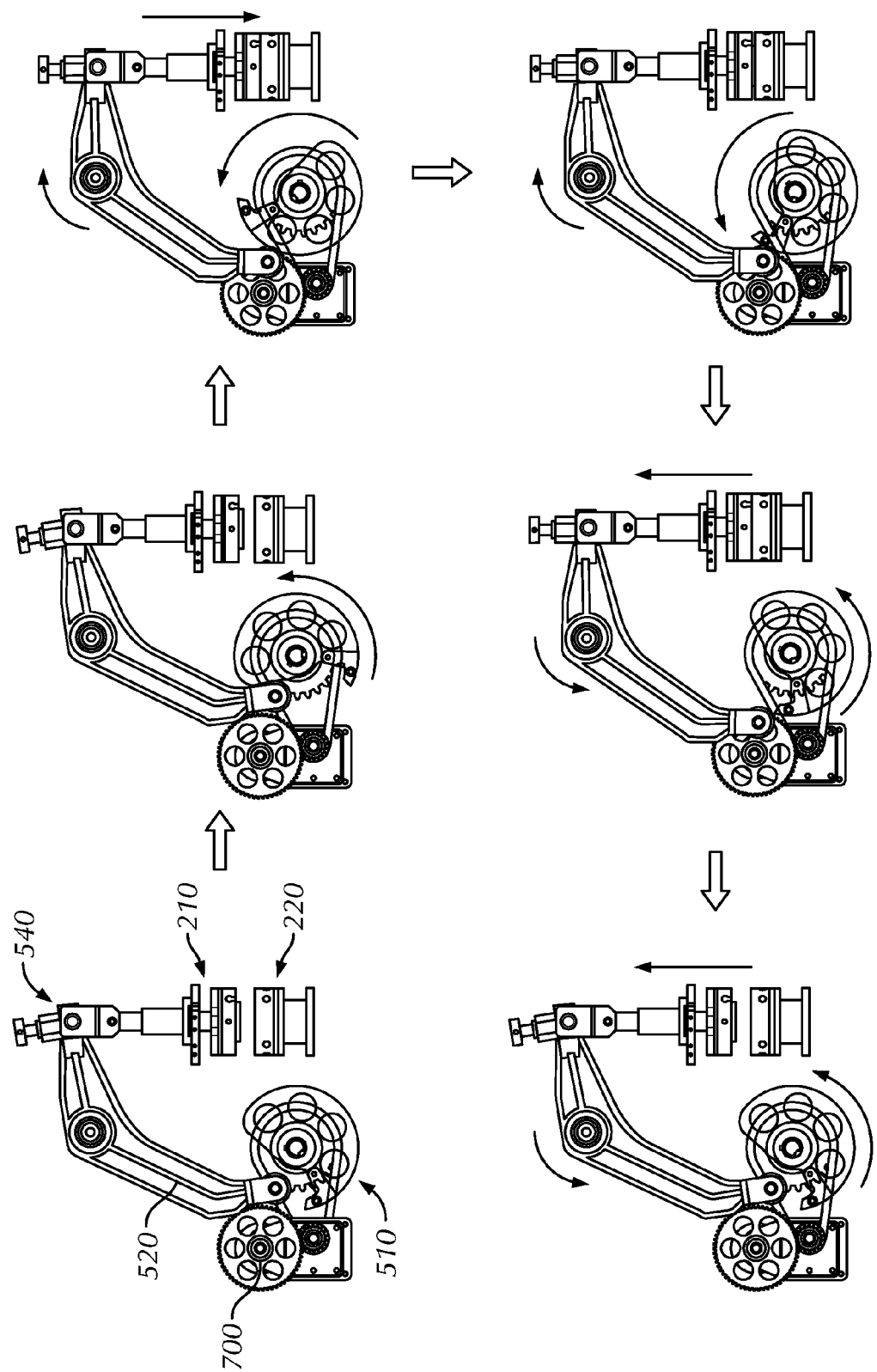
FIG. 12 are schematic views of the opening and closing of the mold unit of FIG. 1 in accord with the operation of the cam of FIG. 8.

Referring now to FIGS. 10, 11 and 12, the operation of the machine 10 for producing expanded-grain cakes according to the present invention is described below. Cereal grains are loaded into the grain storage hopper 310. The conditions at startup are: (1) the grain storage unit 300 is positioned above the grain transfer unit 400; (2) the cam follower 522 of mold pressure unit 500 is released from cam 514 and mold 200 is open; and, the upper and lower molds 210 and 220, respectively, are at elevated temperatures sufficient to compensate for ambient conditions. Optionally, the batch size is set by the control unit 800. When these conditions are met, the control unit 800 operates the groin supply unit 300 and the grain supply unit 300 meters a precise amount of cereal grains required for a single mold charge to the grain transfer unit 400.

The operation of the grain supply unit 300 is now explained in more detail. As shown in FIG. 10, a precise amount of cereal grains required for a single mold charge is metered by the grain receptor well 332 of the supply rotor 330. The cereal grain is gravity fed through the blocking unit 380 and the hopper duct 370 to the inlet 324 of supply rotor 330.

Subsequently, rotational force of the rotor driving motor 350 is transmitted to the supply rotor 330 through the power transmission unit 360,—comprised of motor 350, pulleys 362 and belt 364—and rotates the supply rotor 330 by 180° to align with outlet 326. Then the single charge of the cereal grains which has been limited by the interior wall 322 of rotor housing 360 and by the grain receptor well 332 capacity is supplied to the grain transfer unit 400 through the outlet 326 and the supply funnel 375.

The grain transfer unit 400 containing the cereal grains is moved into the space above the lower mold 220. Thereafter, the single charge of cereal grain is supplied from the grain transfer unit 400 into the lower open portion 222 of the lower mold 220. The grain transfer unit 400 is subsequently returned to its initial position below the grain supply unit 300.

With regard to the operation of the grain transfer unit 400, as shown in FIG. 11, the grain carrier 420, the grain distributor 430, and the plate 440 thereunder are driven together by the first drive unit 450 from the grain supply unit 300 to the space above the lower mold 220. When the plate 440 rotates away from the grain supply unit 300, the grain distributor 430 operates to evenly distribute the grain over the surface of the lower mold 220.

Thereafter the plate 440, as seen most clearly in FIG. 11, is driven in a clockwise direction and releases and evenly spreads the charge of cereal grain over the lower open portion 222 of lower mold 220. When the first drive unit 450 is operated to rotate the plate 440, the second drive unit 460 simultaneously operates to rotate the grain carrier 420. In addition, the first drive unit 450 and the second drive unit 460 are controlled by the control unit 800. During this phase of processing, when an error occurs, the first and second drive units 450 and 460 are stopped by control signals from the control unit 800. While the charge of grain is being transferred the cam 514 continues counterclockwise until the cam follower 522 again engages cam 514.

As seen in FIG. 12, from the above state, the control unit 800 operates the drive unit 600 to rotate the mold pressure unit 500 downwards, thereby closing the preheated mold. Then, the upper mold 210 and the lower mold 220 are tightly clamped together as the moisture content of the cereal grains contained in the closed mold 200 is heated and transformed into a gaseous phase. During this phase, the pressure within the closed cavity rises, cereal grain expansion occurs limited by the mold cavity walls, and a preform with entrapped high pressure steam therewithin results.

The closed-mold phase occurs over a predetermined time. The term "a predetermined time" means the time during which the cam follower 522 travels along the protruding portion of the cam 514.

The operation of the mold pressure unit 500, the mold unit 200 and the open cam 700 by the drive unit 600 is explained in more detail. As shown in FIG. 12, the cam unit 510 is rotated by the drive unit 600. The first end of the pressure arm 520 is moved by the rotation of the cam unit 510.

Here, the pressure arm 520 which is rotatably supported at the medial portion thereof by the frame 100 is moved along the circumference of the cam 514 of the cam unit 510. In detail, the cam follower 522, mounted on the first end of the pressure arm 520, traces the protruding portion of cam 514 and rotatably moves along that portion of the cam 514.

When the first end of the pressure arm 520 is moved by the cam unit 510, the second end of the pressure arm 520 rotates downwards around the medial portion thereof. The rotary block 530 which is coupled both to the second end of the pressure arm 520 and to the upper end of the upper mold 210 is moved downwards by the rotation of the pressure arm 520.

Here, because the upper end of the rotary block 540 is rotatably coupled to the second end of the pressure arm 520 and the lower end thereof is rotatably coupled to the upper end of the upper mold 210, the rotation of the pressure arm 520 is smoothly converted into the linear motion of the upper mold 210.

As such, the upper mold 210 and the lower mold 220 are in a closed mold condition. Because of the mold structure maintains the condition during increasing pressure within the mold cavity. Upon release by the cam reaching the end of the portion thereof, the preform is forcibly ejected from the mold 200.

When the cam follower 522 of the pressure arm 520 completely passes through the protruding portion of the cam 514, the first end of the pressure arm 520 falls downwardly thereby releasing the clamping force and releasing the stored energy in spring tensioner 216. The upper mold 210 then moves upwardly aided additionally by the pressure build up in the cavity and, simultaneously, the mold pressure arm 520 is rotated.

The pressure arm 520 is rotated such that the first end of the pressure arm 520 falls downwardly, that is, towards the circumference of the cam 514, and the second end thereof is rotated upwardly.

When the preform is ejected from the mold unit 200, the entrapped gases therewithin cause the preform to expand and form a cake of the desired size. The protruding portion of the cam unit 510 which rotates in the direction opposite to the direction in which the cam unit 510 is rotated by the drive unit 600 pushes the cam follower 522 of the pressure arm 520 downwards, and assists the upper mold 210 to move upwards.

Figure 13:
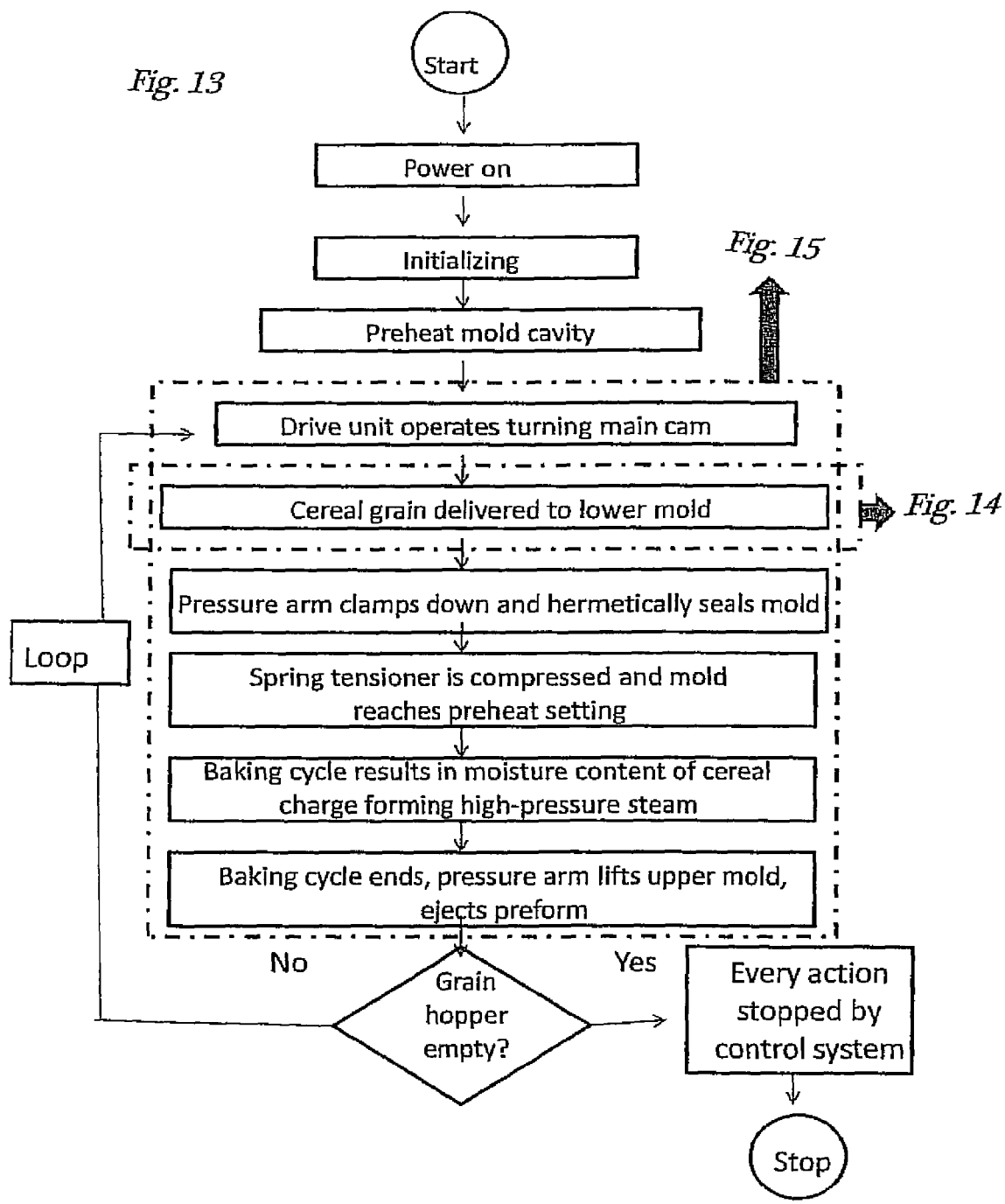
FIG. 13 is a flowchart of a process of producing expanded-grain cakes using the machine of the present invention.
Figure 14:
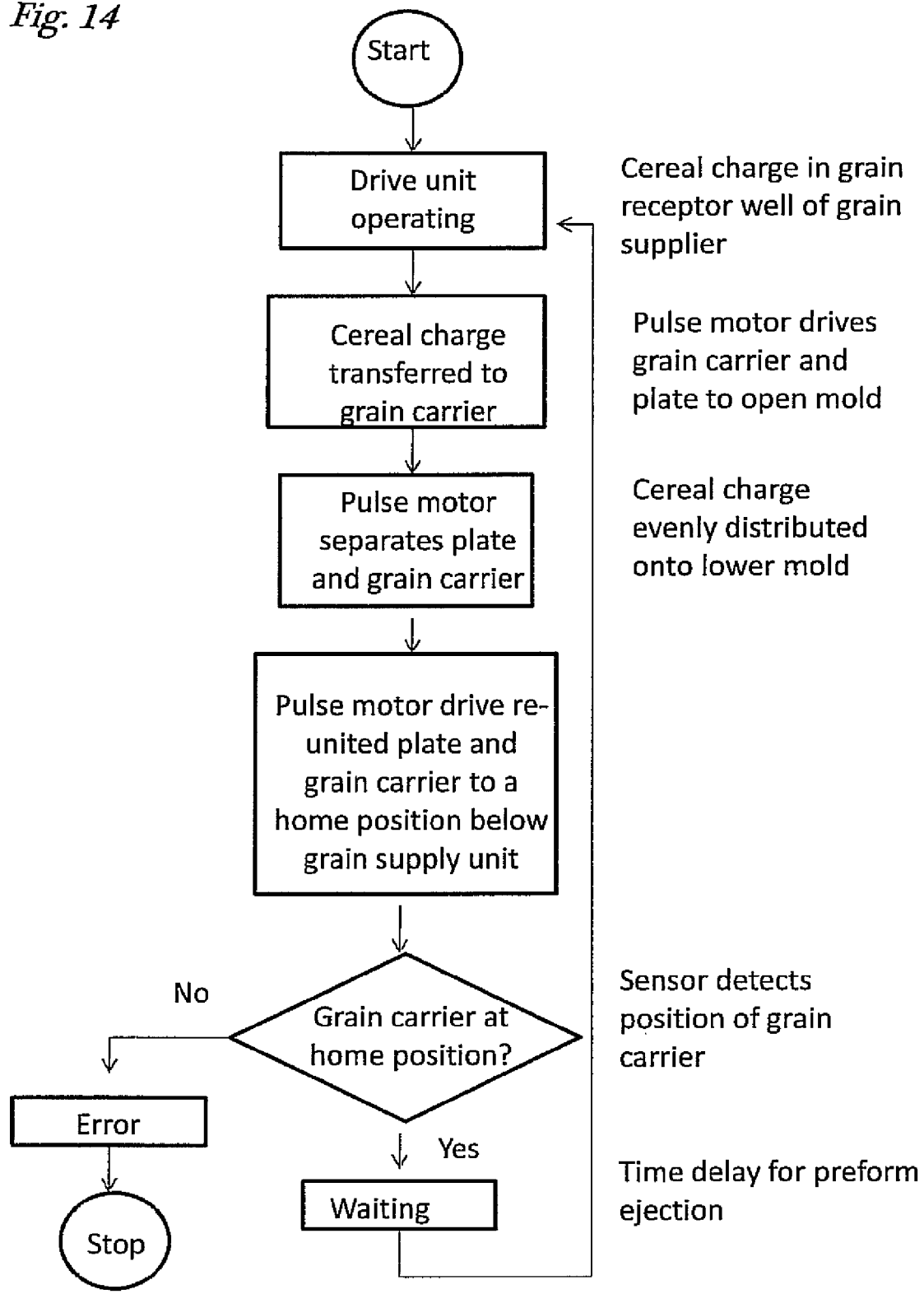
FIG. 14 is a further flowchart of the process of transferring a charge of cereal grains according to the present invention; and, FIG. 15 is a flowchart of a process of producing expanded-grain cakes according to the present invention.
Figure 15:
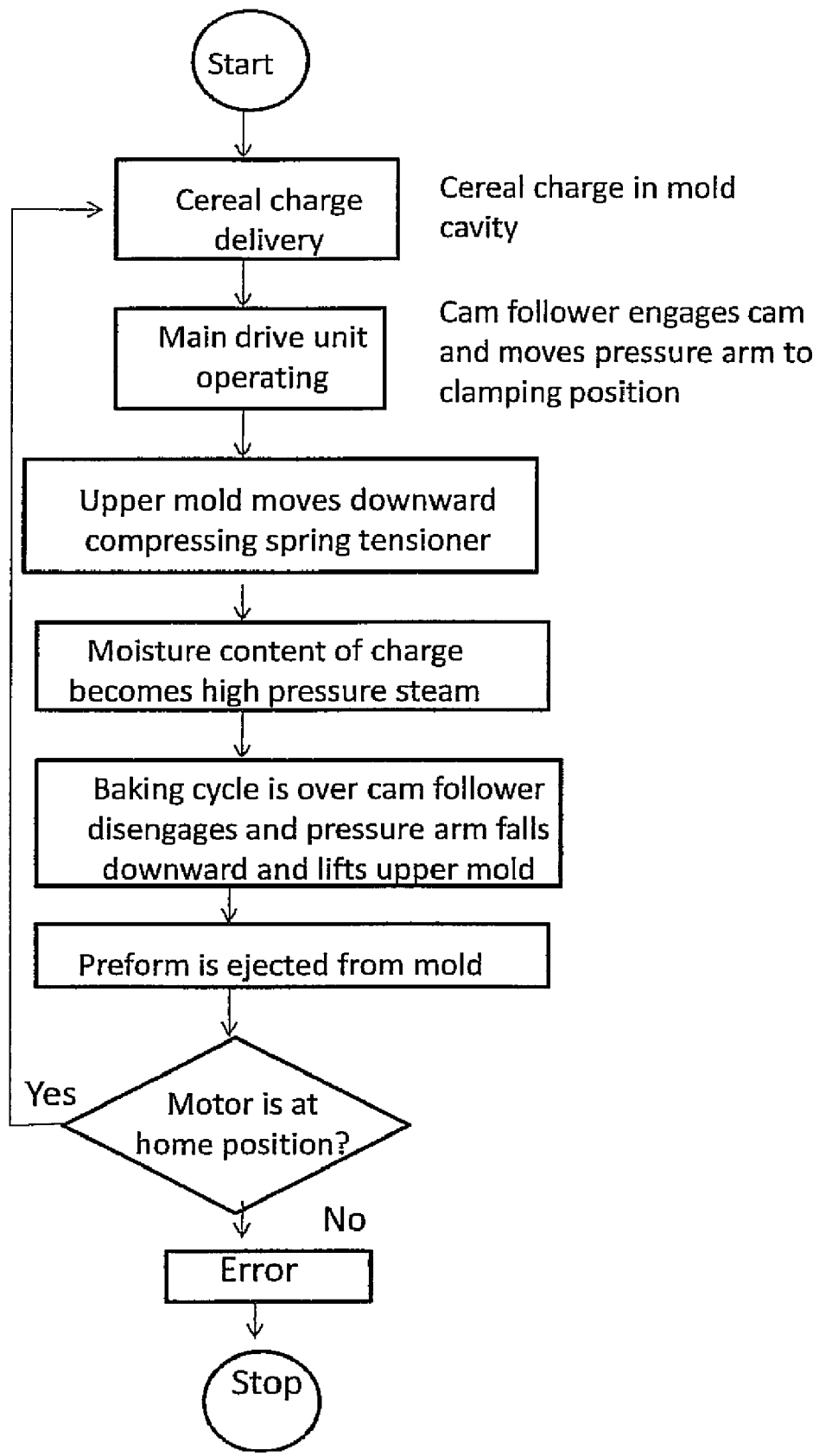

The process of the operation of the machine 10 according to the present invention is explained below. As shown in FIGS. 13 through 15, when power is turned on, the control unit 800 initializes the components to conduct the first operating cycle.

The term "initialization" means checking that the grain supply unit 300 is filled with cereal grain; that the grain transfer unit 400 the mold pressure unit 500, and mold unit 200 are at the correct starting positions and that the drive unit 600 is operative. Optionally, the operator may set the control unit 800 for the number of processing cycles in the initial batch.

Thereafter, the mold unit 200 is heated to a preset temperature which initiates the program delivery of thermal energy by the heater 230. The program compensates for thermal energy losses when the upper and lower molds 210 and 220 are in the mold open state. The program supplies a uniform amount of thermal energy to the mold unit 200 to produce sufficient gaseous content for preform expansion and preform flight on a substantially reproducible trajectory. Under the control of control unit 800, after the upper and lower molds 210 and 220, respectively, are closed, the initial temperature is reduced as the closed system no longer requires compensation for heat losses.

Upon the initiation of the drive unit 600, the cam unit 510 and during the mold-open phase, the cam follower 522 of the pressure arm 520 is not yet in contact with the protruding portion of the cam 514. In addition, as the pressure adjustment unit 540 is in a fully raised condition the upper mold 210 is spaced apart from the upper surface of the lower mold 220.

The initial charge of cereal grain is delivered to mold cavity 222 of the lower mold 200. The supply of cereal grains into the mold cavity 222 is conducted by the grain supply unit 300 and the grain transfer unit 400. This operation is explained in more detail hereinbelow with reference to FIG. 14.

After a charge of the cereal grain is supplied from the grain storage hopper 310 to the grain receptor well 332 of supply rotor 330, the rotor driving motor 350 rotates the supply rotor 330 and, in doing so, precisely meters the charge of cereal grain. Then the charge of cereal grain is gravity fed from supply rotor 330 to the grain transfer unit 400.

The charge of cereal grain enters the grain transfer unit 400, which is positioned below the grain supply unit 300, through inlet 422 of the grain carrier 420 and is disposed on the lower end of which is closed by the plate or support 440.

Thereafter, the grain carrier 420 and the support 440 are moved over the lower mold 220 by the operation of the first and second drive units 450 and 460, respectively. During transit the cereal grain is evenly distributed over the support 440 and, upon further movement of the support 440, deposits the charge on the lower open portion 222 of the lower mold 220 through outlet 326. Subsequently, the support 440 and the grain carrier 420 are returned to their original positions, that is, below the grain supply unit 300. It is noted that the support 440 is the first to return to the original position and grain carrier 420 and grain distributor 430 follow thereafter.

The sensor unit 470 detects the positions of the grain carrier 420 and the support 440 and transmits the detected signals to the control unit 800. The control unit 800 checks the positions of the grain carrier 420 and the support 440. If it is determined that the grain carrier 420 and the support 440 are correctly positioned at the original positions, the control unit 800 maintains such positions for a predetermined dwell time and upon the elapse of the time period, repeats the above-mentioned process. If it is determined that either the grain carrier 420 or the support 440 is not positioned at the correct original positions, the control unit 800 interrupts the operation of all the components.

The closed-mold phase of operations is next described. This entails the closing of the mold unit 200 and thereafter continuously increasing pressure in the mold unit 200 by applying heat. The closed-mold phase ends with the release of the preform, and, upon release, the expansion thereof to the desired expanded cereal grain cake size. The process requires operating the mold pressure unit 500 in conjunction with operating the drive unit 600. This process is explained in more detail with reference to FIG. 15.

The first end of the pressure arm 520 is pushed by the protruding portion of the cam 514 which is rotated by the drive unit 600 resulting in the second end of pressure arm 520 rotating downward. The upper mold 210 which is coupled to the second end of the pressure arm 520 through the coupling 530 is moved onto the lower mold 220, thus closing the mold unit 200.

At this time, the open portion 222 of the lower mold 220 has evenly distributed thereover a charge of cereal grain. In the closed-mold phase, the thermal energy received by the closed-mold unit 200 causes the cereal grain to expand, which expansion is limited by the walls of the mold thereby forming a rudimentary preform with ever-increasing entrained gases therewithin.

After a predetermined period of time, the pressure builds and, upon opening of the mold unit 200, the expanding preform is forcibly ejected from the mold by the gases entrained at high pressure, causing further expansion until the gases reach ambient pressure.

The term "a predetermined period of time" is the time taken to move the cam follower 522 at the first end of the pressure arm 520 along the protruding portion of the cam 514. When the first end of the pressure arm 520 completely passes through the protruding portion of the cam 514, the clamping force on the mold unit 200 is released and, simultaneously, the preform is ejected, as previously described.

Preferably, after the limited expansion of the charge of cereal grains, the upper mold 210 is moved slightly upwards to control the release of pressure from the mold unit 200 and the direction of the preform trajectory.

During the opening of the mold unit 200, the upper mold 210 is moved upwards by the internal pressure and, simultaneously, the open cam 700 rotated by the drive unit 600 pushes the cam follower 522 of the pressure arm 520 downwards, further accelerating the upwards movement of the upper mold 210.

Thereafter, the control unit 800 monitors the positions of the mold unit 200 and the pressure arm 520 by sensing the position of the cam unit 510. When it is determined that the mold unit 200 and the pressure arm 520 are at the correct positions for recharging the mold cavity, the cycle is repeated. If it is determined that the mold unit 200 and the pressure arm 520 are not at the correct positions, the control unit 800 interrupts operations of all the components.

After the completion of the above-described cycle, the cereal grain hopper 310 of the grain supply unit 300 is checked. When the sensor 390 indicates that there is no cereal grain in hopper connection tube 370, the control unit 800 interrupts the operations of all the components. Further, an alarm signal is generated and malfunction of the machine 10 is prevented.

As described above, in a machine for producing expanded-grain cakes according to the present invention, a control unit checks the temperature of a mold unit, the amount of cereal grains and a position of the grain transfer unit and compares the checked values to preset conditions required for producing expanded grain cakes. When the checked values meet the preset conditions, the operation is allowed to continue. Therefore, cereal grains are prevented from being burned in the mold unit, thus preventing defective formation of the expanded-grain cakes and reducing the waste of cereal grains. Furthermore, when the control unit detects a malfunction in the drive unit, the grain supply unit or the grain transfer unit, the operation of the components is immediately interrupted, thus preventing accidents, enhancing the operational reliability of the machine, and extending the lifetime of the machine.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A molding machine for producing an expanded grain cake from a charge of cereal grain, said cereal grain having a known moisture content, said molding machine comprising:
   a frame;
   an induction motor disposed on said frame for transmitting rotational force;
   a first cam disposed in said frame, said first cam driven rotatorily by said induction motor and configured to sequence said molding machine between a mold-open condition and a mold-closed condition;
   a mold mounted on said frame for receiving said charge of cereal grain in the mold-open condition and for forming a preform with entrained high-pressure steam during the mold-closed condition, said mold comprising:
      a lower mold portion fixedly disposed on said frame;
      an upper mold portion mounted atop said lower mold portion, said upper mold portion reciprocally movable between an open and a closed condition;
      said lower mold portion with said upper mold portion in a closed condition defining a mold cavity therebetween;
   a pivot disposed on said frame;
   a pressure arm mounted on said pivot having a coupled end extending substantially vertically between said pivot and said upper mold portion and a free end extending from said pivot away from said coupled end, said pressure arm for applying a clamping force to said upper mold portion during a mold-closed condition and for lifting said upper mold portion away from said lower mold portion upon completion thereof;
   a first heating element in said lower mold portion for delivering a predetermined amount of thermal energy to convert said moisture content of said charge of cereal grain to high pressure steam;
   a second heating element in said upper mold portion for delivering a predetermined amount of thermal energy to convert said moisture content of said charge of cereal grain to high pressure steam; and,
   a controller in functional cooperative relation to said first heating element and said second heating element for programmatic control thereof and for compensating for local variations in power supplied and compensating for heat loss during a mold-open condition, said controller, upon sensed deviation from the program, interrupting operation of said molding machine.

2. A molding machine as described in claim 1 further comprising:
   a grain supply unit disposed on said frame for gravity feeding a single one of said charge of cereal grain for each operating cycle of said molding machine, said grain supply unit further comprising:
      a hopper detachably mounted on said frame above said mold for delivering by gravity feed a charge of cereal grain each time the mold reaches a mold-open condition;
      a supply rotor for receiving grain from said hopper and for precisely metering the grain supply, said supply rotor mounted below said hopper and rotatable to a grain receiving position and to a grain delivering position;
      a hopper connection tube extending from said hopper to said supply rotor;

an ingredient sensor mounted on and monitoring said hopper connection tube, said ingredient sensor providing an output signal to said controller when said hopper has less than a single charge of cereal grain to deliver, said output signal enabling the controller to interrupt operation of the molding machine until the cereal grain supply is replenished.

3. A molding machine as described in claim 2 further comprising:
a grain supply motor for rotating said supply rotor, said grain supply motor mounted on said frame and to said supply rotor;
a rotor sensor for monitoring the angular position of said supply rotor and providing an output signal to said controller upon occurrence of a deviation from a predetermined position; and,
said controller, upon a sensed deviation from a predetermined position, interrupting operation of said molding machine, and, upon review prior to initialization, enabling a determination of desired positioning for operation.

4. A molding machine as described in claim 3 further comprising:
a grain transfer unit for receiving said charge of cereal grain from said grain supply unit and for delivering and evenly distributing said charge of cereal grain to said lower mold portion of said mold, said grain transfer unit disposed on said frame below said grain supply unit and adjacent said mold, said grain supply unit comprising:
a grain carrier mounted for reciprocal movement between a home position below said grain supply unit and a deliver position above said lower mold portion of said mold in the mold-open condition;
a support plate mounted to said grain carrier and movable therewith after receiving said charge of cereal grain and, upon reaching said lower mold portion of said mold, movable separately away from said grain carrier to permit delivery of said charge of cereal grain to said mold.

5. A molding machine as described in claim 4 further comprising:
a first pulse motor, during the mold-open condition, for driving the grain carrier and the support plate from the home position to above the lower mold portion, said first pulse motor connected to said grain transfer unit through a first gear train;
a second pulse motor for driving during the mold-open condition said support plate away from said grain carrier, said second pulse motor connected to said support through a second gear train, and, after delivering said charge of cereal grain, said first pulse motor reuniting said support plate and said grain carrier at the home position.

6. A molding machine as described in claim 5 further comprising:
a home position sensor disposed on said grain transfer unit, said home position sensor providing an output signal to said controller, enabling the controller to interrupt operation of the molding machine when the grain transfer unit is improperly positioned, and enabling the controller, upon review prior to initialization, to establish system readiness.

7. A molding machine as described in claim 6 wherein said controller has a molding machine readiness program permitting initialization upon meeting required temperature condition, ingredient presence, supply rotor position, and grain transfer home position.

8. A molding machine for producing an expanded-grain cake from a charge of cereal grain, said cereal grain having a known moisture content, said molding machine comprising:
a frame;
a heated mold disposed on said frame having a fixedly mounted lower mold portion and an upper mold portion reciprocally movable between a closed condition and an open condition, said lower mold portion and said upper portion, when in the closed condition, defining a mold cavity therebetween;
a grain supply unit disposed on said frame for gravity feeding a single one of said charge of cereal grain for each operating cycle of said molding machine, said grain supply unit, in turn, further comprising:
a hopper detachably mounted on said frame above said mold for delivering, by gravity feed, a charge of cereal grain to the mold each time the mold reached a mold-open condition said delivery occurring after ejection of a previously molded cake;
a supply rotor for receiving grain from said hopper and for precisely metering the grain supply to the open mold, said supply rotor mounted below said hopper;
a hopper connection tube extending from said hopper to said supply rotor;
an ingredient sensor mounted on said hopper connection tube for providing an output signal when said hopper has less than a single charge of cereal grain to deliver;
a controller in functional cooperative relationship with said ingredient sensor, upon receiving said output signal from said ingredient sensor interrupting the operation of said molding machine.

9. A molding machine as described in claim 8 further comprising:
a grain supply motor for rotating said supply rotor, said grain supply motor mounted on said frame and to said supply rotor;
a rotor sensor for monitoring the angular position of said supply rotor and providing an output signal to said controller upon occurrence of a deviation from a predetermined position; and,
said controller, upon a sensed deviation from a predetermined position, interrupting operation of said molding machine, and, upon review prior to initialization, enabling a determination of desired positioning for operation.

10. A molding machine as described in claim 9 further comprising:
a grain transfer unit for receiving said charge of cereal grain from said grain supply unit and for delivering and evenly distributing said charge of cereal grain to said lower mold portion of said mold, said grain transfer unit disposed on said frame below said grain supply unit and adjacent said mold, said grain supply unit comprising:
a grain carrier mounted for reciprocal movement between a home position below said grain supply unit and a deliver position above said lower mold portion of said mold in the mold-open condition;
a support plate mounted to said grain carrier and movable therewith after receiving said charge of cereal grain and, upon reaching said lower mold portion of said mold, movable separately away from said grain carrier to permit delivery of said charge of cereal grain to said mold.

11. A molding machine as described in claim 10 further comprising:
a first pulse motor, during the mold-open condition, for driving the grain carrier and the support plate from the home position to above the lower mold portion, said first pulse motor connected to said grain transfer unit through a first gear train;

a second pulse motor for driving during the mold-open condition said support plate away from said grain carrier, said second pulse motor connected to said support through a second gear train, and, after delivering said charge of cereal grain, said first pulse motor reuniting said grain carrier and said support plate at the home position.

12. A molding machine as described in claim 11 further comprising:

a home position sensor disposed on said grain transfer unit, said home position sensor providing an output signal to said controller, enabling the controller to interrupt operation of the molding machine when the grain transfer unit is improperly positioned, and enabling the controller, upon review prior to initialization, to establish system readiness.

13. A molding machine as described in claim 12 wherein said controller has a grain supply system check program permitting initialization upon meeting required ingredient presence, supply rotor position, and grain transfer home position.

14. A molding machine as described in claim 8 further comprising:

a first heating element in said lower mold portion for delivering a predetermined amount of thermal energy to convert said moisture content of said charge of cereal grain to high pressure steam;

a second heating element in said upper mold portion for delivering a predetermined amount of thermal energy to convert said moisture content of said charge of cereal grain to high pressure steam; and, said controller further being in functional cooperative relation to said first heating element and said second heating element for programmatic control thereof and for compensating for local variations in power supplied and compensating for heat loss during a mold-open condition, said controller, upon sensed deviation from the program, interrupting operation of said molding machine.

15. A molding machine for producing an expanded-grain cake from a charge of cereal grain, said cereal grain having a known moisture content, said molding machine comprising:

a frame;

a grain supply unit disposed on said frame for gravity feeding a single one of said charge of cereal grain for each operating cycle of said molding machine;

a mold disposed on said frame below said grain supply unit, said mold, in turn, further comprising:

a lower mold portion fixedly disposed on said frame;

an upper mold portion mounted atop said lower mold portion, said upper mold portion reciprocally positionable between a mold-open condition and a mold-closed condition, said lower mold portion with said upper mold portion thereon in a closed position defining a mold cavity therebetween;

a pivot disposed on said frame;

a pressure arm mounted on said pivot having a coupled end extending substantially vertically to and joined to said upper mold portion and a free end, extending from said pivot, away from said coupled end, said pressure arm further comprising:

an adjustable portion threadedly extendable and retractable to lengthen and shorten said coupled end of said pressure arm to remove any endplay between said pressure arm and said upper mold portion of said mold;

a first heating element in said lower mold portion for delivering a predetermined amount of thermal energy to convert said known moisture content of said charge of cereal grain to high pressure steam;

a second heating element in said upper mold portion for delivering a predetermined amount of thermal energy to convert said known moisture content of said charge of cereal grain to high pressure steam;

said first heating element and said second heating element providing at the end of the operating cycle a preform of cereal grain with entrained high pressure steam therewithin;

said free end of said pressure arm, upon reaching said mold-open condition, falls downwardly to lift said upper mold portion and simultaneously said high pressure steam in said mold cavity expands to lift the upper mold portion and to eject said preform;

whereby said preform, upon ejection, expands to form an expanded grain cake of the desired size.

16. A molding machine as described in claim 15 further comprising:

a grain transfer unit for receiving said charge of cereal grain from said grain supply unit and for delivering and evenly distributing said charge of cereal grain to said lower mold portion of said mold, said grain transfer unit disposed on said frame below said grain supply unit and adjacent said mold, said grain supply unit comprising:

a grain carrier mounted for reciprocal movement between a home position below said grain supply unit and a deliver position above said lower mold portion of said mold in the mold-open condition;

a support plate mounted to said grain carrier and movable therewith after receiving said charge of cereal grain and, upon reaching said lower mold portion of said mold, movable separately away from said grain carrier to permit delivery of said charge of cereal grain to said mold.

17. A molding machine as described in claim 16 further comprising:

a first pulse motor, during the mold-open condition, for driving the grain carrier and the support plate from the home position to above the lower mold portion, said first pulse motor connected to said grain transfer unit through a first gear train;

a second pulse motor for driving during the mold-open condition said support plate away from said grain carrier, said second pulse motor connected to said support through a second gear train, and, after delivering said charge of cereal grain, said first pulse motor reuniting said support plate and said grain carrier at the home position.

18. A molding machine as described in claim 17 further comprising:

a spring tensioner mounted atop said upper mold portion, said spring tensioner being compressed downwardly during said mold-closed condition by said pressure arm, and, upon reaching said mold-open condition, exerting a sudden upward spring force against said pressure arm.

19. A molding machine as described in claim 18 further comprises:

a main drive unit disposed in said frame for providing rotary power;

a first cam disposed on said frame and rotatably driven by said motor drive unit, said cam configured for cooperative functional relation with said pressure arm having a protruding portion thereof;

a cam follower at said free end of said pressure arm for tracing said cam and, when engaging said protruding portion thereof, rotating the pressure arm to apply a clamping force to said upper mold portion and to compress said spring tensioner; and, said cam follower tracing said protruding portion of said first cam defining the mold-closed condition of the molding machine.

20. A molding machine as described in claim 19 further comprising:

a second cam disposed on said frame and rotatably driven by said main drive unit and operating when said first cam at the end of said mold-closed condition and said spring tensioner fail to open the mold, said second cam positioned to have a protruding portion thereof act oppositely to that of said first cam and pivot said pressure arm in a direction to provide a lifting force to said upper mold portion.

* * * * *